United States Patent
Raghavan et al.

(10) Patent No.: US 10,735,059 B2
(45) Date of Patent: Aug. 4, 2020

(54) DYNAMIC BEAMFORMING USING A CO-PHASING FACTOR

(71) Applicant: QUALCOMM Incorporated, San Diego, CA (US)

(72) Inventors: Vasanthan Raghavan, West Windsor Township, NJ (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/221,055

(22) Filed: Dec. 14, 2018

(65) Prior Publication Data

US 2019/0253112 A1  Aug. 15, 2019

Related U.S. Application Data

(60) Provisional application No. 62/629,988, filed on Feb. 13, 2018.

(51) Int. Cl.
*H04B 7/0456* (2017.01)
*H04B 7/0417* (2017.01)
*H04B 7/08* (2006.01)
*H04B 7/06* (2006.01)
*H04L 5/00* (2006.01)

(52) U.S. Cl.
CPC ......... *H04B 7/0456* (2013.01); *H04B 7/0417* (2013.01); *H04B 7/063* (2013.01); *H04B 7/0695* (2013.01); *H04B 7/084* (2013.01); *H04L 5/0048* (2013.01)

(58) Field of Classification Search
CPC .... H04B 7/0456; H04B 7/0695; H04B 7/063; H04B 7/084; H04B 7/0417; H04L 5/0048
USPC .................................................. 375/260, 262
See application file for complete search history.

(56) References Cited

U.S. PATENT DOCUMENTS

2016/0337056 A1* 11/2016 Frenne .................. H04B 7/0695
2018/0254813 A1*  9/2018 Gao ...................... H04B 7/0456

FOREIGN PATENT DOCUMENTS

WO    2017027055 A1    2/2017
WO    2017173201 A1   10/2017

OTHER PUBLICATIONS

International Search Report and Written Opinion—PCT/US2018/066063—ISA/EPO—dated Mar. 14, 2019.

* cited by examiner

*Primary Examiner* — Fitwi Y Hailegiorgis
(74) *Attorney, Agent, or Firm* — Harrity & Harrity

(57) ABSTRACT

Various aspects of the present disclosure generally relate to wireless communication. A first wireless communication device determines a co-phasing factor between at least two transmit beams transmitted by a second wireless communication device. The co-phasing factor is determined for generation of at least one co-phased beam by the second wireless communication device. The first wireless communication device transmits information to the second wireless communication device identifying the co-phasing factor. Numerous other aspects are provided.

30 Claims, 10 Drawing Sheets

DYNAMIC BEAMFORMING USING A CO-PHASING FACTOR

CROSS-REFERENCE TO RELATED APPLICATIONS UNDER 35 U.S.C. § 119

This application claims priority to U.S. Provisional Application No. 62/629,988, filed on Feb. 13, 2018, entitled "TECHNIQUES AND APPARATUSES FOR DYNAMIC BEAMFORMING," which is hereby expressly incorporated by reference herein.

FIELD OF THE DISCLOSURE

Aspects of the present disclosure generally relate to wireless communication, and more particularly to techniques and apparatuses for dynamic beamforming using a co-phasing factor.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first wireless communication device may include determining a co-phasing factor between at least two transmit beams transmitted by a second wireless communication device, wherein the co-phasing factor is determined for generation of at least one co-phased beam by the second wireless communication device; and transmitting information identifying the co-phasing factor to the second wireless communication device.

In some aspects, a first wireless communication device for wireless communication may include memory and one or more processors operatively coupled to the memory. The memory and the one or more processors may be configured to determine a co-phasing factor between at least two transmit beams transmitted by a second wireless communication device, wherein the co-phasing factor is determined for generation of at least one co-phased beam by the second wireless communication device; and transmit information identifying the co-phasing factor to the second wireless communication device.

In some aspects, a non-transitory computer-readable medium may store one or more instructions for wireless communication. The one or more instructions, when executed by one or more processors of a first wireless communication device, may cause the one or more processors to determine a co-phasing factor between at least two transmit beams transmitted by a second wireless communication device, wherein the co-phasing factor is determined for generation of at least one co-phased beam by the second wireless communication device; and transmit information identifying the co-phasing factor to the second wireless communication device.

In some aspects, an apparatus for wireless communication may include means for determining a co-phasing factor between at least two transmit beams transmitted by a wireless communication device, wherein the co-phasing factor is determined for generation of at least one co-phased beam by the wireless communication device; and means for transmitting information identifying the co-phasing factor to the second wireless communication device.

In some aspects, a method of wireless communication performed by a base station may include receiving information identifying a co-phasing factor for at least one co-phased beam to be transmitted by the base station for a user equipment (UE), wherein the information identifying the co-phasing factor is based at least in part on at least two transmit beams transmitted to the UE by the base station; and transmitting the at least one co-phased beam to the UE based at least in part on the co-phasing factor.

In some aspects, a first wireless communication device for wireless communication may include memory and one or more processors operatively coupled to the memory. The memory and the one or more processors may be configured to receive information identifying a co-phasing factor for at least one co-phased beam to be transmitted by the first wireless communication device for a second wireless communication device, wherein the information identifying the co-phasing factor is based at least in part on at least two transmit beams transmitted to the second wireless communication device by the first wireless communication device; and transmit the at least one co-phased beam to the second wireless communication device based at least in part on the co-phasing factor.

In some aspects, a non-transitory computer-readable medium may store one or more instructions for wireless communication. The one or more instructions, when executed by one or more processors of a first wireless communication device, may cause the one or more processors to receive information identifying a co-phasing factor for at least one co-phased beam to be transmitted by the first wireless communication device for a second wireless communication device, wherein the information identifying the co-phasing factor is based at least in part on at least two transmit beams transmitted to the second wireless communication device by the first wireless communication device; and transmit the at least one co-phased beam to the second wireless communication device based at least in part on the co-phasing factor.

In some aspects, an apparatus for wireless communication may include means for receiving information identifying a co-phasing factor for at least one co-phased beam to be transmitted by the apparatus for a wireless communication device, wherein the information identifying the co-phasing factor is based at least in part on at least two transmit beams transmitted to the wireless communication device by the apparatus; and means for transmitting the at least one co-phased beam based at least in part on the co-phasing factor to the wireless communication device.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
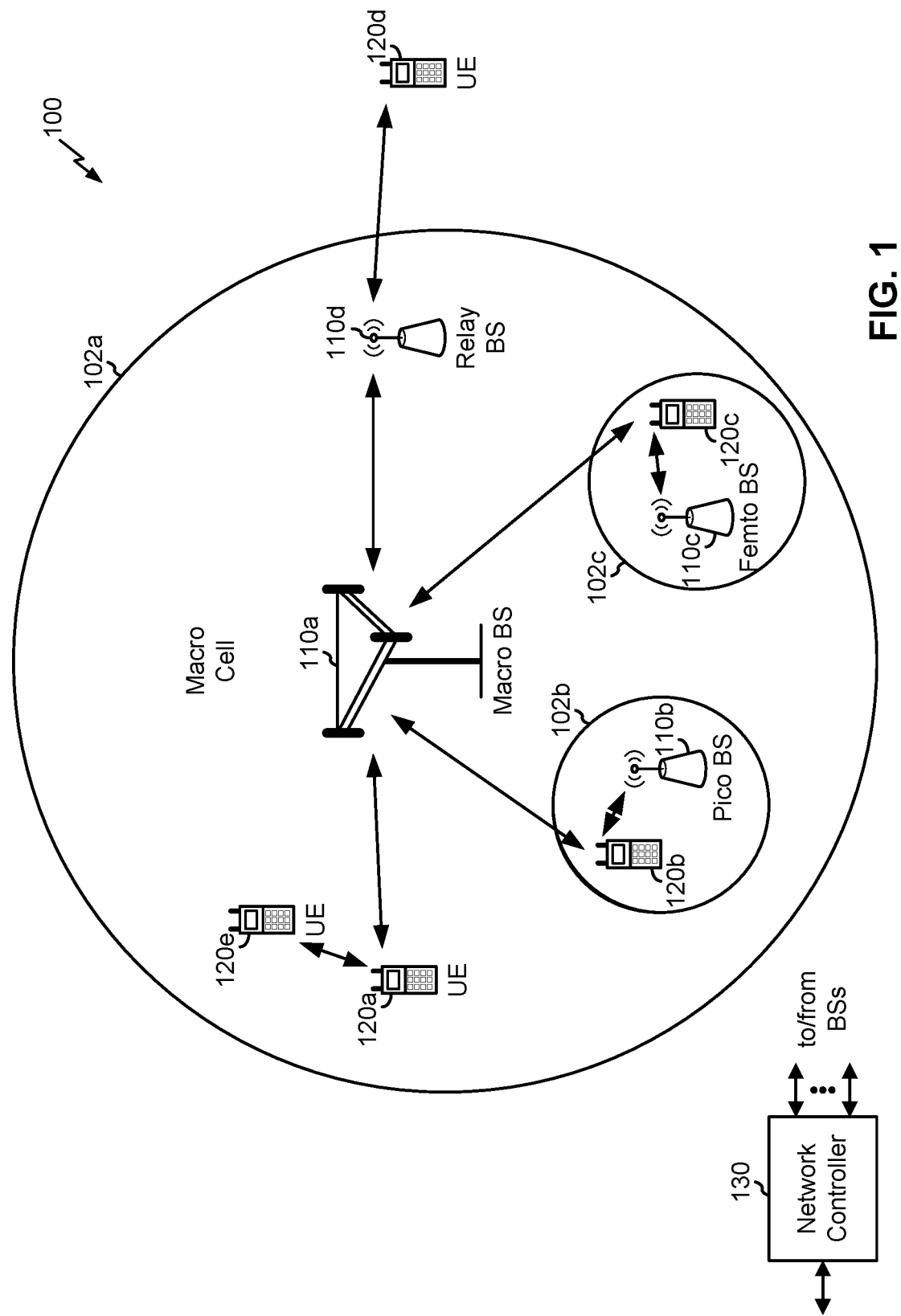
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided as an example. Other examples may differ from what is described with regard to FIG. 1.

Figure 2:
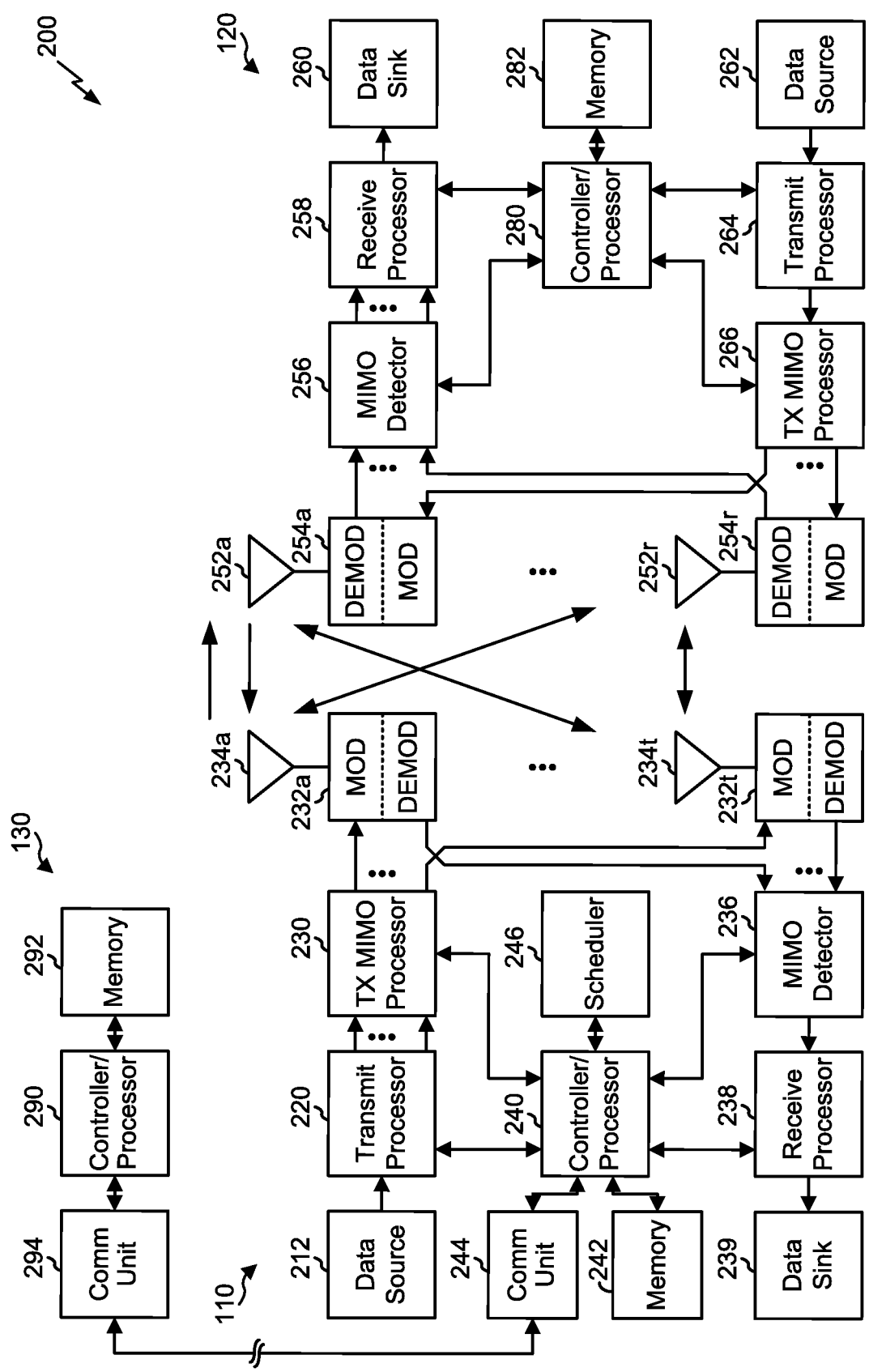
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with dynamic beamforming in millimeter (mmWave) systems, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, process 700 of FIG. 7, and/or other processes as described herein. Memories 242 and 282 may store data and program codes for BS 110 and UE 120, respectively. A scheduler 246 may schedule UEs for data transmission on the downlink and/or uplink.

In some aspects, a first wireless communication device (e.g., UE 120 or BS 110) may include means for determining a co-phasing factor between at least two transmit beams transmitted by a second wireless communication device; means for transmitting information identifying the co-phasing factor to a second wireless communication device; means for receiving, using one or more sampling beams of the first wireless communication device, one or more training symbols from the second wireless communication device via at least one co-phased beam; means for performing a receive beam refinement procedure based at least in part on the one or more training symbols; means for determining or modifying the at least one receive beam based at least in part on the one or more training symbols; means for determining whether to use a codebook-based technique, or a technique using the co-phasing factor, for the at least one co-phased beam or the at least one receive beam; means for transmitting, to the second wireless communication device, information identifying the at least two transmit beams; and/or the like. In some aspects, such means may include one or more components of UE 120 or BS 110 described in connection with FIG. 2.

In some aspects, a first wireless communication device (e.g., BS 110 or UE 120) may include means for receiving information identifying a co-phasing factor for at least one co-phased beam to be transmitted by the first wireless communication device for a second wireless communication device (e.g., UE 120 or BS 110); means for transmitting the at least one co-phased beam to the second wireless communication device based at least in part on the co-phasing factor; means for transmitting signals to the second wireless communication device on the at least two transmit beams, wherein the co-phasing factor is based at least in part on a correlation of the signals; means for receiving in response to transmitting the signals to the second wireless communication device on the at least two transmit beams; means for generating and transmitting the co-phased beam based on the at least two transmit beams and the co-phasing factor; means for transmitting one or more training symbols to the second wireless communication device using the at least one co-phased beam; and/or the like. In some aspects, such means may include one or more components of BS 110 or UE 120 described in connection with FIG. 2.

As indicated above, FIG. 2 is provided merely as an example. Other examples may differ from what is described with regard to FIG. 2.

Wireless communication devices (e.g., UEs, BSs, CPEs, etc.) may use beamforming to improve radio performance and increase throughput. This may be particularly useful in the mmWave context, in which the high operating frequency can lead to significant path loss. When communicating using beamforming, a transmitting wireless communication device may generate a transmit beam, and a receiving wireless communication device may generate a corresponding receive beam. The transmit beam may propagate and reflect, propagate through, or otherwise be affected by one or more reflectors, obstacles, and/or materials within an environment between or around the transmitting and receiving devices. Some transmit beams may be reflected or propagate along similar paths, which may be referred to herein as clusters. The term clusters may refer to clusters of channels or beams that travel a similar, though not identical, path between a transmitting device and a receiving device.

To configure beamforming, a UE and a BS may perform a first phase (sometimes termed a P-1 phase), and optionally refinement phases at the BS and at the UE (sometimes termed P-2 and P-3 phases, respectively). In the P-1 phase, the BS may generate multiple transmit beams from a codebook. The UE may generate multiple corresponding receive beams, and may report a top M transmit beam indices (e.g., using a random access mechanism) back to the BS. The BS and the UE may communicate using one or more of the top M transmit beams and one or more corresponding receive beams. Optionally, the BS can refine the one or more of the top M transmit beams in the P-2 phase, and the UE can refine the one or more corresponding receive beams in the P-3 phase.

However, the codebook-based approach for beam selection may have certain drawbacks. For example, codebook-based beam selection may not fully leverage the space of all possible phase shifter and amplitude control combinations for creating beams. This may be the case, for example, with mmWave carrier waves where path loss may be quite different for slightly different angles or paths. Furthermore, codebook-based beam selection may cause latency in beam switching and beam management. Still further, codebook-based beam selection may be sub-optimal relative to a scheme that combines multiple clusters in a channel path of the UE/BS to determine a beam. Further, in the case of blockage, the codebook-based beam selection technique may switch from one cluster to a second-best cluster, which may decrease performance of receive and transmit beams.

Some techniques and apparatuses described herein use a dynamic approach to determine at least one transmit beam and/or receive beam. For example, some techniques and apparatuses described herein provide feedback and construction methods to generate non-codebook beams for use by the BS and/or by the UE. Furthermore, some techniques and apparatuses described herein provide a selection method for determining whether to use the codebook-based beam selection or the dynamic approach. In some aspects, the techniques and apparatuses described herein may provide for beam refinement at the UE and/or the BS based at least in part on the dynamic approach. The non-codebook beams may be based at least in part on a co-phasing factor between two or more clusters (e.g., two or more transmit beams or two or more receive beams), which may improve performance of the UE and/or the BS relative to using a codebook-based beam for a single cluster. In this way, radio performance of the UE and the BS are improved by dynamic selection or determination of a non-codebook-based beam. This may be particularly beneficial in mmWave, wherein clusters and blockages may have more significant impacts on the channel or may frequently change, thereby necessitating improved refinement or frequent reconfiguration of the beams.

Figure 3A:
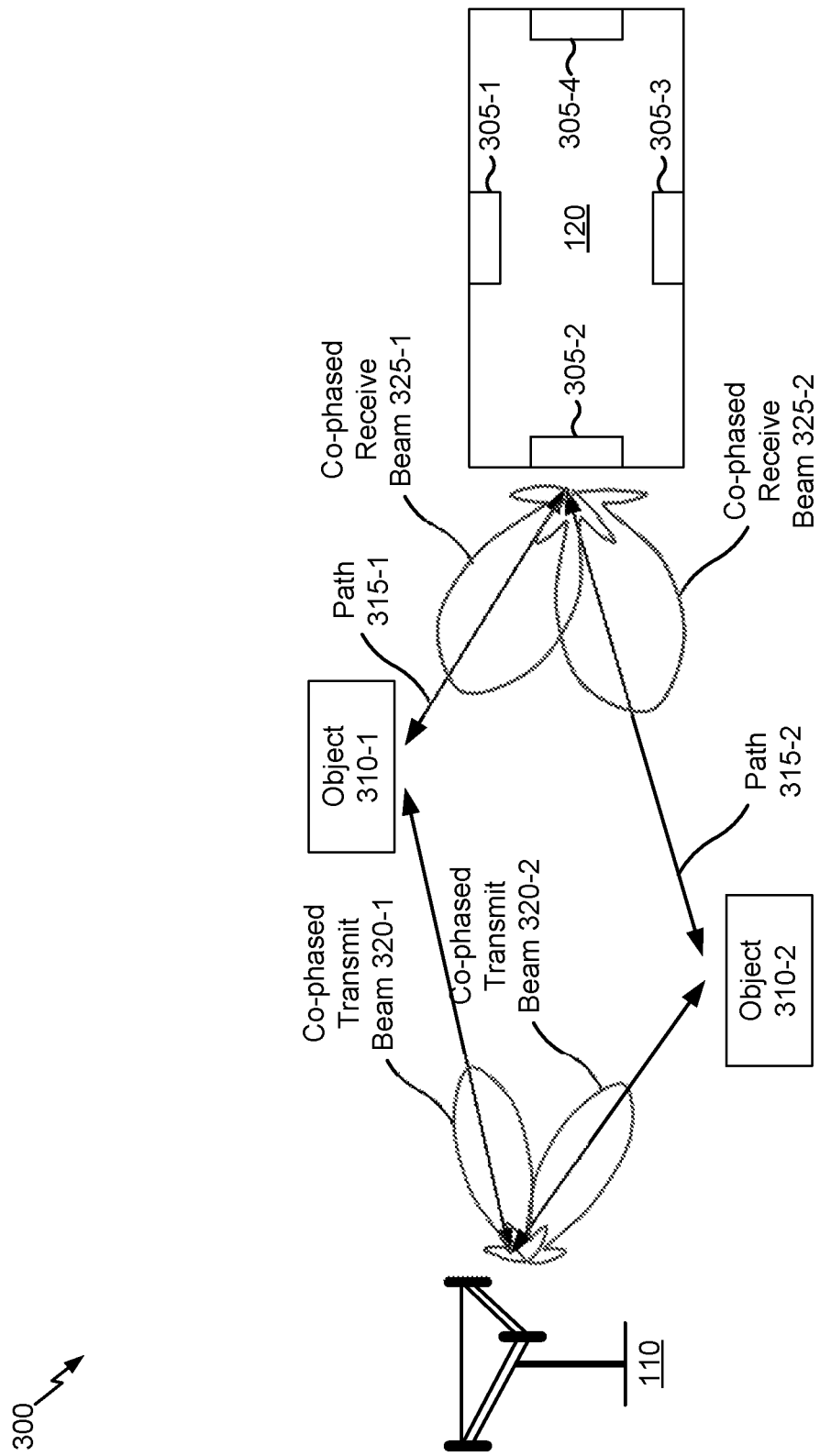
FIGS. 3A and 3B are diagrams illustrating examples of co-phased beams generated by a base station and a UE, in accordance with various aspects of the present disclosure.
Figure 3B:
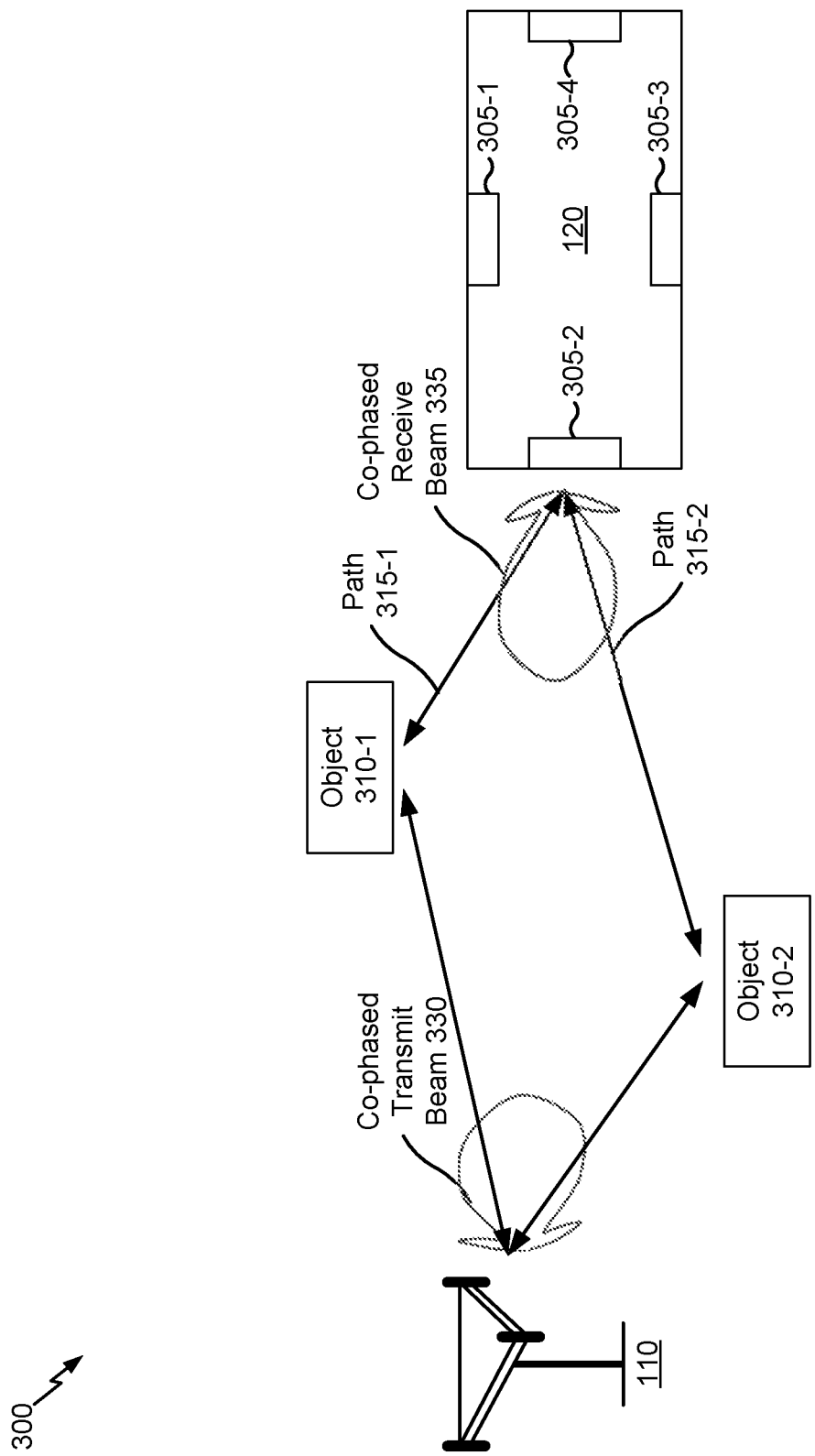

FIGS. 3A and 3B are diagrams illustrating examples 300 of co-phased beams generated by a base station and a UE, in accordance with various aspects of the present disclosure.

As shown in FIG. 3A, a UE 120 may include one or more subarrays 305 (e.g., subarrays 305-1 through 305-4). A subarray 305 may include an antenna subarray of two or more antennas. For example, a subarray 305 may have 2 to 8 antennas, although other numbers of antennas are possible. In some aspects, the BS 110 may include one or more subarrays. For example, the BS 110 may have a planar array of 64 antennas, 128 antennas, or a different number of antennas. For a more detailed description of the antennas and/or receive chains of a wireless communication device (e.g., UE 120 or BS 110), refer to the description accompanying FIG. 9.

As further shown, one or more clusters of channels or paths may be present between the UE 120 and the BS 110. A cluster may include any paths or channels created or modified by an object 310, such as a reflector, blocker, and/or other obstacle or object in the radio environment. As further shown, a first path 315-1 between the UE 120 and the BS 110 illustrates a direction along which one or more channels between the BS 110 and UE 120 may be created due to a reflection off of an object 310-1 (such as a building, wall, vehicle, furniture, or the like). A number of channels traveling a path along or similar to the first path 315-1 may form a cluster of channels that can be transmitted or received using a single transmit beam or receive beam (e.g., a beam directed at the angle between the first path and the transmitting or receiving antennas). Similarly, a second path 315-2 between the UE 120 and the BS 110 illustrates a direction along which one or more other channels between the BS 110 and UE 120 may be created due to a reflection off of an object 310-2. A number of channels traveling a path along or similar to the second path 315-2 may form a cluster of channels that can be transmitted or received using a single transmit beam or receive beam 330 or a single receive beam (e.g., a beam directed at the angle between the second path and the transmitting or receiving antennas). In some aspects, different clusters and/or different beam paths 315 may be associated with a phase offset relative to each other. For example, the phase offset may be the offset between transmit antennas used to transmit a beam at a specified angle or may be the offset between receive antennas used to receive a beam at a specified angle. There may be, and likely are, other paths between the BS 110 and UE 120, but the paths 315 may represent the best paths for communication between the BS and UE 120.

As shown, the BS 110 may transmit data or information along co-phased transmit beams 320. Here, the BS 110 transmits co-phased transmit beams 320-1 and 320-2. Each transmit beam 320 may be directed toward a path where a strong channel or cluster of channels is located. The BS 110 may generate the co-phased transmit beams based at least in part on a co-phasing factor. For example, the co-phasing factor may identify the phase offset between path 315-1 and 315-2, and may be determined by the UE 120, as described in more detail elsewhere herein. By providing the co-phasing factor for generation of the co-phased transmit beams 320, the UE 120 enables dynamic generation of the co-phased transmit beams 320 (e.g., without reliance on a codebook-based technique to generate the co-phased transmit beams 320). Furthermore, since the co-phased transmit beams 320 take into account the phase offset associated with the paths 315, performance of the co-phased transmit beams 320 may be improved relative to a set of codebook-based beams that do not take into account the phase offset.

The co-phasing factor may define a phase offset, an amplitude offset, and/or the like, between two or more beams (e.g., transmit beams or receive beams). For example, a wireless communication device may generate a beam using a phase shift (e.g., phase offset) to be applied to one or more antennas of the wireless communication device. This phase shift may be denoted by a variable P. A phase shift may be referred to herein as P, a transmit beam may be referred to herein as T, and a receive beam may be referred to herein as R. In some aspects, P may identify a phase shift and/or an amplitude for one or more antennas to generate a corresponding beam T or R. For example, P may be a vector or matrix that identifies the phase shifts and/or amplitudes for the one or more antennas. The co-phasing factor may identify a relative phase shift and/or a relative amplitude difference between two or more values of P for two or more beams, and may be denoted by X. For simplicity of illustration, the case wherein two beams are combined to form one co-phased beam is described here, although aspects described herein may be applied for many different combinations of co-phased beams and component beams (e.g., transmit beams or receive beams). In this case, the wireless communication device may generate one or more co-phased beams as follows:

$$P_1 + X^*P_2 = R, \text{ or}$$

$$P_1 + X^*P_2 = T.$$

As can be seen, the co-phased beam may be generated based at least in part on a linear combination of $P_1$, $P_2$, and X. X may be a vector or matrix that identifies differences between $P_1$ and $P_2$ so that the linear combination of $P_1$ and $X^*P_2$ produces a co-phased beam. Here, $P_1$ and $P_2$ may correspond to a best beam and a second-best beam for the wireless communication device, and the co-phased beam may be directed to clusters associated with the best beam and the second-best beam, thereby achieving performance and/or reliability gains relative using one of the best beam or the second-best beam. The above is provided as just one example of how to implement a co-phasing factor, and other examples are contemplated herein.

As further shown, the UE 120 may generate co-phased receive beams 325 corresponding to the co-phased transmit beams 320. For example, the UE 120 may generate the co-phased receive beams 325 based at least in part on a receive beam refinement procedure, as described in more detail elsewhere herein. In this way, the UE 120 generates co-phased receive beams 325 to receive the co-phased transmit beams 320 using the dynamic (e.g., non-codebook-based) technique, which improves versatility of beamforming and improves radio performance of the UE 120 relative to determining the receive beams using a codebook-based technique.

In some aspects, the paths between the UE 120 and the BS 110 may include many clusters. The techniques and apparatuses described herein may be particularly helpful in that case. For example, by dynamically determining and refining co-phased transmit beams and receive beams, UE 120 and BS 110 may improve radio performance relative to performing a codebook-based approach, since the codebook-based approach may not provide an optimal solution with regard to phase offsets needed to capture the top clusters, or may provide a lower number of transmit beams and/or receive beams.

FIG. 3B shows an example wherein the BS 110 generates a single co-phased transmit beam 330 to cover all clusters along different paths 315. For example, the single co-phased transmit beam 330 may be generated based at least in part on the phase offset between the transmit beams, as described in more detail elsewhere herein. As further shown, the UE 120 may generate a corresponding co-phased receive beam 335. For example, the UE 120 may generate the corresponding co-phased receive beam 335 based at least in part on a receive beam refinement procedure, as described in more detail elsewhere herein. Providing a single co-phased receive beam or transmit beam may conserve resources that would otherwise be used to generate a poorly targeted single beam or to generate multiple beams. Providing multiple co-phased receive beams or transmit beams may improve radio performance of the UE 120 and/or BS 110 relative to providing a single beam.

As indicated above, FIGS. 3A and 3B are provided as examples. Other examples may differ from what is described with respect to FIGS. 3A and 3B.

Figure 4:
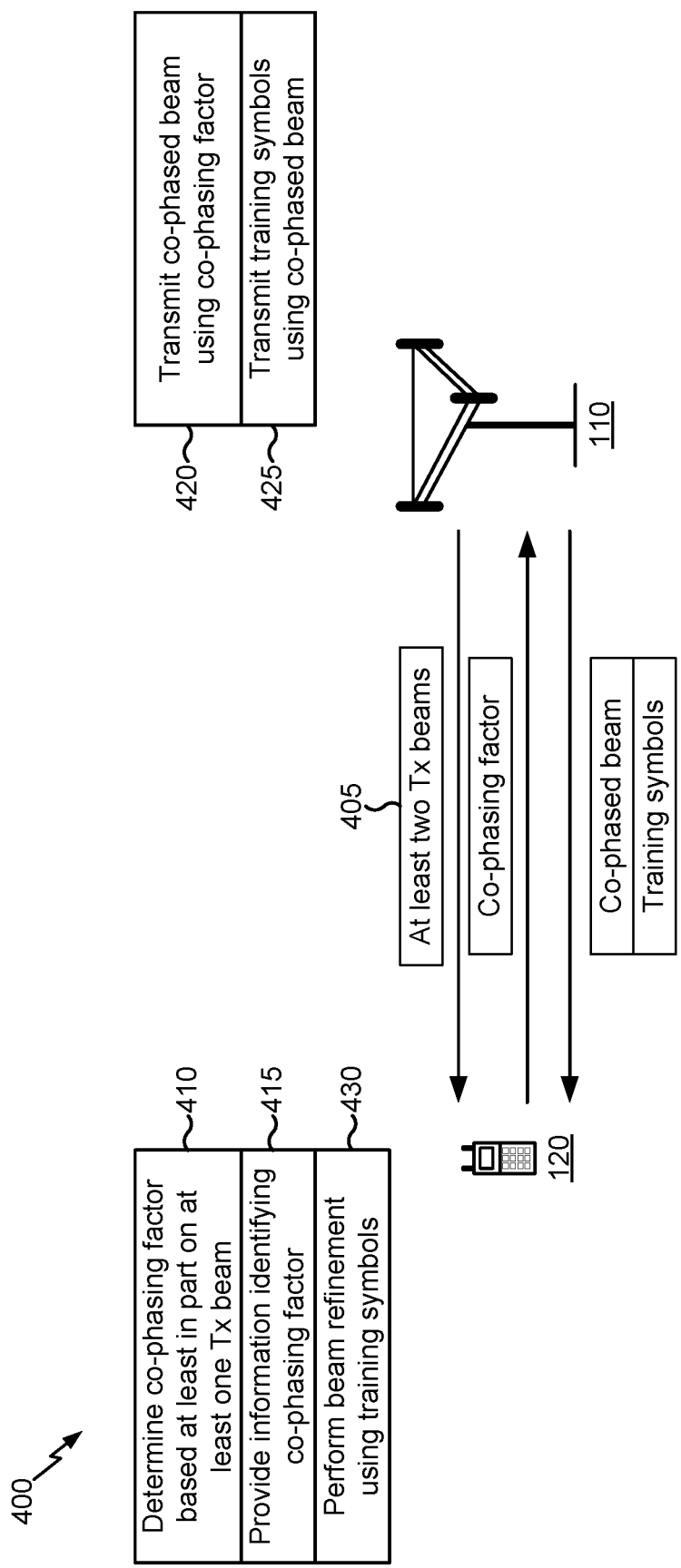
FIG. 4 is a diagram illustrating an example of determining a co-phasing factor for generating a co-phased beam, in accordance with various aspects of the present disclosure.

FIG. 4 is a diagram illustrating an example 400 of determining a co-phasing factor for generating a co-phased beam, in accordance with various aspects of the present disclosure. FIG. 4 includes a UE 120 as a first wireless communication device and a BS 110 as a second wireless communication device. However, this is for simplicity of description only. In other words, FIG. 4 is applicable for any first wireless communication device (e.g., UE 120, BS 110, a CPE, etc.) and any second wireless communication device (e.g., UE 120, BS 110, a CPE, etc.).

As shown in FIG. 4, and by reference number 405, a BS 110 may transmit at least two transmit (Tx) beams to a UE 120. In some aspects, the at least two transmit beams may be based at least in part on a codebook. For example, the BS 110 and the UE 120 may perform a beam pairing procedure to identify a top M transmit beams. The BS 110 may generate the co-phased beam based at least in part on the top M transmit beams, as described in more detail elsewhere herein.

As shown by reference number 410, the UE 120 may determine a co-phasing factor (e.g., X in the example provided above) based at least in part on the at least two transmit beams (e.g., the top M transmit beams of the at least two transmit beams). For example, the UE 120 may determine the co-phasing factor based at least in part on a phase offset and/or amplitude difference between the at least two transmit beams. In some aspects, the UE 120 may determine the co-phasing factor by comparing an original phase of the at least two transmit beams to a received phase of the at least two transmit beams. For example, the co-phasing factor may be based at least in part on a correlation of signals received by the UE 120 with transmission of the signals by the BS 110. In some aspects, the UE 120 may determine the co-phasing factor by comparing a phase of a first beam, of the at least two transmit beams, to a phase of a second beam of the at least two transmit beams. The co-phasing factor may be fed back to and used by the BS 110 to generate the co-phased transmit beam, as described in more detail below. In some cases, multiple co-phasing factors may be used to co-phase more than two transmit beams. For example, if the top M beams include four beams, a co-phasing factor between each pair of beams, for a total of six co-phasing factors, may be used.

In some aspects, the UE 120 may determine a quantization of the co-phasing factor. For example, the UE 120 may determine a quantization of the co-phasing factor using a B-bit phase shifter (B can be any integer). The quantization may conserve processor and signaling resources that would otherwise be used to provide a higher-granularity co-phasing factor.

As shown by reference number 415, the UE 120 may provide, to the BS 110, information identifying the co-phasing factor. For example, the UE 120 may provide a value of the co-phasing factor or a quantization of the co-phasing factor. In some aspects, the UE 120 may provide information identifying beams to which the co-phasing factor relates. For example, the UE 120 may determine and provide the co-phasing factor for a top M beams of the P-1 or codebook phase. This conserves processor resources that would otherwise be used to determine and provide co-phasing factors for a larger set of beams. In some aspects, the UE 120 may determine a first co-phasing factor to be used to generate a co-phased transmit beam (e.g., at the BS 110), and may feedback the first co-phasing factor to the BS 110 for generation of the co-phased transmit beam. The UE 120 may determine a second co-phasing factor to be used to generate a co-phased receive beam (e.g., at the UE 120), and may generate the co-phased receive beam using the second co-phasing factor. The determination of the second co-phasing factor is described in more detail elsewhere herein.

In some aspects, the UE 120 may provide the co-phasing factor periodically, continuously, and/or the like. This may allow for dynamic adjustment of the co-phased beams described below. In some aspects, the UE 120 may provide co-phasing factors for multiple, different sets of beams. For example, the UE 120 may determine co-phasing factors with regard to two or more sets of beams, and may provide the co-phasing factors to the BS 110.

As shown by reference number 420, the BS 110 may transmit a co-phased beam (e.g., a co-phased transmit beam) using the co-phasing factor. For example, the BS 110 may generate the co-phased beam according to the following equation:

$$f_{gNB} = \sum_{i=1}^{M} v_i e^{j\phi_i} \text{ where } \phi_i \in \{\psi_0, \cdots, \psi_{2^B-1}\}.$$

In this equation, $f_{gNB}$ is a co-phased beam, $v_i$ is a set of the top M beams of the at least one transmit beam, $\varphi_i$ is the quantization of the co-phasing factor, and $\psi$ is the co-phasing factor. In some aspects, $\varphi_i$ can be set as equal to $\psi_0$ without loss in generality.

As shown by reference number 425, the BS 110 may transmit training symbols using the co-phased beam. For example, the BS 110 may transmit training symbols so that the UE 120 can perform receive beam refinement with regard the co-phased transmit beam. In some aspects, the UE 120 may generate one or more sampling beams, and may use the one or more sampling beams to perform receive beam refinement.

The UE 120 may determine and/or refine a co-phased receive beam based at least in part on the co-phased transmit beam using a beam refinement procedure. A detailed description of the beam refinement procedure is provided below. At a high level, the UE 120 may use multiple different sampling beams to receive training symbols in order to determine a best M receive beams corresponding to two or more transmit beams (and/or a co-phased transmit beam) that were used to transmit the training symbols. In some cases, receive beams with a best M channel conditions or channel conditions that satisfy a threshold may be selected for receiving information on corresponding transmit beams (or the co-phased transmit beam(s)) as a result of the beam refinement. In some aspects, the UE may determine a symbol estimate for each sampling beam, perform a channel estimate using the symbol estimates, and perform the receive beam refinement procedure based at least in part on the channel estimate. The UE 120 may determine a co-phasing factor between these best M receive beams, for example, using the techniques described below.

In some aspects, the UE 120 may generate a number of sampling beams to estimate the received signal (e.g., associated with the co-phased transmit beam) across all antennas in a serving subarray of the BS 110. The number of sampling beams may be greater than or equal to a number of antennas in the serving subarray. The UE 120 may combine signals or training symbols received using the sampling beams over multiple training symbols to determine a receive covariance matrix estimate. The UE 120 may use the dominant unit-norm eigenvector of this covariance matrix, or may use a quantized eigenvector of the covariance matrix, to determine a receive beam $g_{UE}$. This approach may be referred to herein as the first approach.

A receive beam determined using the first approach may be based at least in part on long-term channel correlation/covariance information, and may be used in a control channel (e.g., a physical downlink control channel or a physical uplink control channel). One use case for the above approach may be a multi-cluster channel with a beam switching rate that is slower than a fading rate of the channel. If beams can be adapted or refined for each channel fade, an optimal beam tailored for each channel fade can be determined on the fly. If beams cannot be adapted or refined for each channel fade, UE 120 may determine a robust beam choice that works over all possible channel fades or a subset of channel fades. The above approach may also be useful in a dense urban setting with a high incidence of blockage (e.g., humans, vehicles, foliage, buildings, etc.), which may benefit from the use of a more robust beam choice for stability considerations.

A more detailed description of the first approach is provided below. Assume that a BS 110 transmits $f_{gNB}$ as a serving beam (e.g., a co-phased transmit beam). Let $N_r$ denote the number of antennas of UE 120. Let $H_{n,k}$ denote the channel matrix between the BS 110 and the UE 120 at the n-th sampling period (n=1, N) and over the k-th sub-band or resource block (k=1, K). The BS 110 may transmit $N_r$ training symbols ($s_j$, j=1, . . . , $N_r$) beamformed along $f_{gNB}$ to produce the following beams:

$$y_{n,k,j} = \sqrt{\rho} \cdot H_{n,k} f_{gNB} s_j + n_{n,k,j}$$

The UE 120 may use $N_r$ sampling beams (denoted as $\tilde{g}_1, \ldots \tilde{g}_{N_r}$) to produce the corresponding symbol estimates as follows:

$$\hat{s}_j = \tilde{g}_j^H y_{n,k,j} = \sqrt{\rho} \cdot \tilde{g}_j^H H_{n,k} f_{gNB} s_j + \tilde{g}_j^H n_{n,k,j}$$

The UE 120 may construct a receive covariance matrix estimate based at least in part on the symbol estimates as follows:

$$\hat{\Sigma}_{N,K} = \frac{1}{NK} \sum_{n=1}^{N} \sum_{k=1}^{K} S_{n,k} S_{n,k}^{H} \text{ where } S_{n,k} = \begin{bmatrix} \hat{s}_1 \\ \vdots \\ \hat{s}_{N_r} \end{bmatrix}$$

The UE 120 may update $g_{UE}$ (e.g., the co-phased receive beam) as the dominant unit-norm eigenvector of $\hat{\Sigma}_{N,K}$, or may quantize the dominant unit-norm eigenvector to meet appropriate phase shifter or amplitude control constraints.

In some aspects, the UE 120 may determine $g_{UE}$ based at least in part on a codebook. For example, the UE 120 may use a receive signal estimated across all antennas of the UE 120. The UE 120 may attempt to determine a better beam to co-phase the receive signal from a codebook. In some aspects, the codebook may identify all possible phase shifter and amplitude control combinations. In such a case, the codebook may sometimes be termed a super-codebook. In some aspects, the codebook may identify a subset of possible phase shifter and amplitude control combinations. Using a codebook that identifies all possible phase shifter and amplitude control combinations may lead to a more finely-tuned receive beam, whereas using a codebook that identifies a subset of possible phase shifter and amplitude control combinations may conserve resources of the UE 120. This approach may be referred to herein as the second approach.

The second approach may be useful for shared channel (e.g., physical downlink shared channel or physical uplink shared channel) applications. For example, the second approach may be useful for a CPE with limited angular spread at the receiver and the transmitter, a number of dominant clusters, low mobility, a relatively stationary channel environment, a good phase noise mask, and/or the like. As another example, the second approach may be useful for a low-mobility UE where enhanced feedback information can be obtained that allows co-phasing across clusters. As yet another example, the second approach may be useful for self- or hand-blockage that does not impact all antennas of the UE 120. As still another example, the second approach may be useful for self-blockage or hand-blockage that impacts some or all of the antennas of the UE 120 completely and there are poor sub-dominant clusters in the channel (e.g., when subarray switching may not help).

A more detailed description of the above approach (e.g., using the super-codebook) is provided below. In some aspects, the second approach may use a single instantiation of the first approach (e.g., using N=1 and K=1). Assume that H denotes the channel matrix. The BS 110 may transmit $N_r$ training symbols ($s_j$, j=1, ..., $N_r$) beamformed along $f_{gNB}$ to produce:

$$y_j = \sqrt{\rho} \cdot H f_{gNB} s_j + n_j.$$

The UE 120 may use $N_r$ sampling beams (denoted as $\{\tilde{g}_1, \ldots, \tilde{g}_{N_r}\}$) to produce the corresponding symbol estimates as follows:

$$\hat{s}_j = \tilde{g}_j^H y_j = \sqrt{\rho} \cdot \tilde{g}_j^H H f_{gNB} s_j + \tilde{g}_j^H n_j$$

The sampling beams may include any set of beams for which $\mathcal{G} = [\tilde{g}_1 \ldots \tilde{g}_{N_r}]$ is unitary. In some aspects, G may be both unitary and of equal amplitude (two examples with $N_r$=4). In some aspects, G may sample antennas one at a time (e.g., using an identity matrix). The UE 120 may estimate an effective channel at UE 120 as follows:

$$\widetilde{Hf_{gNB}} = [\tilde{g}_1 \cdots \tilde{g}_{N_r}] \cdot \begin{bmatrix} \hat{s}_1 \\ \vdots \\ \hat{s}_{N_r} \end{bmatrix}$$

Using the effective channel, the UE 120 may estimate a receive beam (e.g., a best beam). In some aspects, the UE 120 may estimate a receive beam using a codebook (e.g., a super-codebook) of size M that identifies all possible phase shifter and amplitude control combinations, denoted as $C_r = \{g_1, \ldots, g_M\}$. The receive beam may be described as follows:

$$g_{UE} = \arg \max_{g_j \in C_r} |g_j^H \widetilde{Hf_{gNB}}|^2$$

In some aspects, the UE 120 may estimate the receive beam based at least in part on a quantization of an effective channel estimate. For example, the UE 120 may quantize the effective channel estimate entry-by-entry from an appropriate set of phase shifter and amplitude quantization $Q(.)$. The UE 120 may determine the receive beam as follows:

$$g_{UE} = \begin{bmatrix} Q(\widetilde{Hf_{gNB}}(1)) \\ \vdots \\ Q(\widetilde{Hf_{gNB}}(N_r)) \end{bmatrix} \text{ where }$$

$$Q(x) = \arg \min_{A_i} [A_i - |x|] \text{ and } \arg \min_{\psi_i} |\psi_j - \angle x|.$$

As shown by reference number 430, the UE 120 may perform receive beam refinement with regard to a receive beam corresponding to the co-phased beam using the training symbols. For example, the UE 120 may perform receive beam refinement (e.g., a P-3 phase) to refine or modify the receive beam based at least in part on the training symbols. In some aspects, the UE 120 may use at least one of the first approach or the second approach described in connection with reference number 425, above, to perform the receive beam refinement. In this way, the UE 120 dynamically refines a co-phased receive beam associated with a co-phased transmit beam that is generated using a non-codebook-based technique. Thus, performance of the UE 120 in dynamically-changing channel conditions and/or with multiple clusters is improved.

In some aspects, the BS 110 may perform a transmit beam refinement procedure. For example, the BS 110 may perform the P-2 phase of a beam refinement procedure. In some aspects, the BS 110 may use an approach similar to the first approach (e.g., the covariance matrix estimate approach) described above. For example, the BS 110 may determine a covariance matrix estimate for the co-phased beam, as described above. In some aspects, one or more simplified eigenvectors and/or principal components of the covariance matrix for the co-phased beam can be used to generate $f_{gNB}$.

In some aspects, the BS 110 may determine or refine the co-phased beam based at least in part on a super-resolution approach, such as multiple signal classification (MUSIC), estimation of signal parameters via rotational invariance techniques (ESPRIT), space-altering generalized expectation-maximization (SAGE), and/or the like. For example, assume that the BS 110 has N antennas receiving signals from K unknown directions, defined by a noise space:

$$x = \alpha_1 a_R(\theta_1) + \underbrace{\sum_{k=2}^{K} \alpha_k a_R(\theta_k) + n}_{n'}, n' \sim \mathcal{N}(0, R_n)$$

In that case, the BS 110 may determine directions $\{\theta_1, \ldots \theta_K\}$ if that have a satisfactory mean-squared-error (MSE) value and a low computational cost. In some aspects, the BS 110 may perform MUSIC to determine the direction. For example, the directions may occupy a K-dimensional subspace and may be orthogonal to a noise subspace of an oversampling factor $R_x$. The BS 110 may define a pseudo-spectrum as:

$$P_{MUSIC}(\theta) = \frac{1}{\sum_{n=K+1}^{N} |a_R(\theta)^H q_n|^2},$$

wherein are $\{q_{K+1}, \ldots, q_N\}$ sub-dominant eigenvectors of $R_x$. Thus, the directions may be peaks of the pseudo-spectrum.

As indicated above, FIG. 4 is provided as an example. Other examples are possible and may differ from what was described with respect to FIG. 4.

Figure 5:
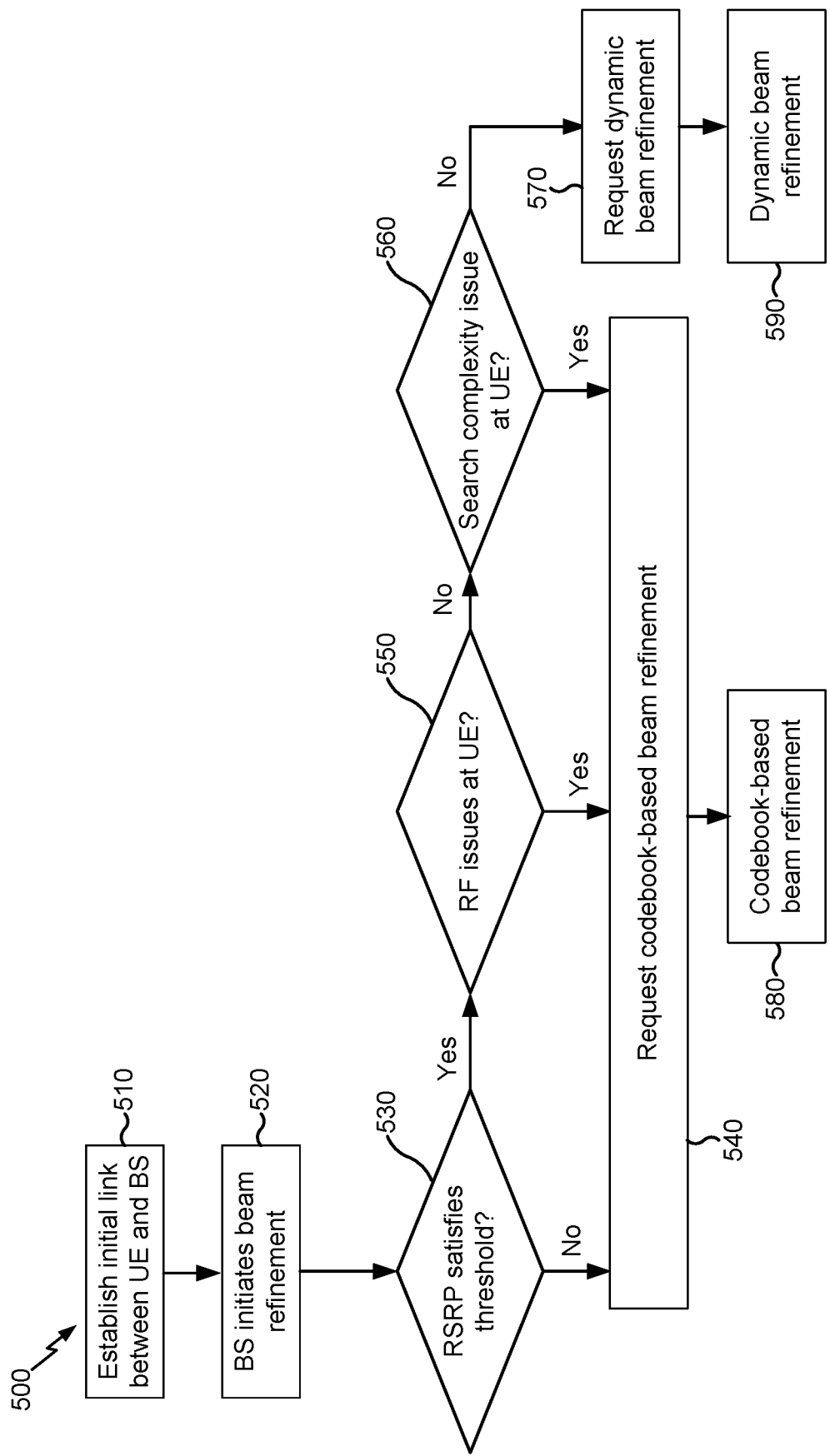
FIG. 5 is a diagram illustrating an example process for determining whether to use a codebook-based beam refinement technique or a dynamic beam refinement technique, in accordance with various aspects of the present disclosure.

FIG. 5 is a diagram illustrating an example process 500 for determining whether to use a codebook-based beam refinement technique or a dynamic beam refinement technique, in accordance with various aspects of the present disclosure. In some aspects, codebook-based beam refinement and non-codebook-based (e.g., dynamic) beamforming may be associated with different advantages and benefits. For example, codebook-based beamforming may be used if the channel is sparse (e.g., has few clusters) and a channel structure observed by the UE (e.g., UE 120) is captured by the codebook. Dynamic beamforming may be used if the channel has multiple clusters or the channel structure seen by the UE is random, as might happen with hand blockage. As another example, codebook-based beamforming performance may be lower-bounded by the poorest estimate of beams from the codebook, whereas dynamic beamforming performance can be significantly poorer if the effective channel estimate is poor. In other words, dynamic beamforming may not be beneficial in poor link margin conditions.

Furthermore, search complexity of codebook-based beamforming may be limited by codebook sizes, whereas search complexity of dynamic beamforming can be higher than for codebook-based beamforming. Still further, codebook-based beamforming performance suffers less from phase noise, carrier frequency offset (CFO) drift, and/or the like.

As shown in FIG. 5, and by reference number 510, the UE 120 and the BS 110 may establish an initial link. As shown by reference number 520, the BS 110 may initiate beam refinement. For example, the BS 110 may initiate a P-2 phase, P-3 phase, or latter phase of a beam refinement procedure.

As shown by reference number 530, the UE 120 may determine whether a RSRP of the UE 120 satisfies a threshold. For example, the UE 120 may determine whether a reference or measurement satisfies the threshold. When the reference or measurement does not satisfy the threshold (e.g., when the channel link margin is low) (block 530—NO), then the UE 120 may request a codebook-based beam refinement procedure (block 540). In this way, the UE 120 may use codebook-based beam refinement when the channel link margin is low.

As shown by reference number 550, when the reference or measurement satisfies the threshold (e.g., when the channel link margin is high) (block 530—YES), then the UE 120 may determine whether radio frequency (RF) issues are detected at the UE 120. For example, the UE 120 may determine whether phase noise, CFO drift, and/or the like are detected at the UE 120. When RF issues are detected at the UE 120 (block 550—YES), then the UE 120 may request a codebook-based beam refinement procedure.

As shown by reference number 560, when there are not RF issues at the UE 120 (block 550—NO), then the UE 120 may determine whether there is a search complexity issue at the UE 120. For example, searching a super-codebook associated with dynamic beamforming may be more resource-intensive than searching a codebook for codebook-based beam refinement. When the UE 120 determines that there is a search complexity issue (block 560—YES), then the UE 120 may request a codebook-based beam refinement procedure.

When the UE 120 determines that the RSRP satisfies the threshold and there is not an RF issue or a search complexity issue, the UE 120 may request dynamic beam refinement (block 570). In some aspects, the UE 120 may request codebook-based beam refinement or dynamic beam refinement based at least in part on a subset of the above factors. For example, the UE 120 may request dynamic beam refinement based at least in part on at least one of the conditions shown by blocks 530, 550, and 560.

In some aspects, the UE 120 may request dynamic or codebook-based beam refinement based at least in part on a measure of robustness of communications between the UE 120 and the BS 110. For example, when robustness of the channel satisfies a threshold, the UE 120 may use dynamic beam refinement. When the robustness of the channel does not satisfy the threshold, the UE 120 may use codebook-based beam refinement.

In some aspects, the UE 120 may request dynamic or codebook-based beam refinement based at least in part on a mobility state of the UE 120. For example, when the mobility state of the UE 120 does not satisfy a threshold (e.g., when the mobility is low), the UE 120 may request dynamic beam refinement. When the mobility state satisfies the threshold (e.g., when mobility of the UE is high), the UE 120 may request codebook-based beam refinement.

In some aspects, the UE 120 may request dynamic or codebook-based beam refinement based at least in part on a number of dominant clusters or paths in a channel between the UE 120 and the BS 110. For example, when the number of dominant clusters or paths is low or does not satisfy a threshold (e.g., when the channel is sparse), the UE 120 may request codebook-based beam refinement. When the number of dominant clusters or paths is high or satisfies a threshold (e.g., when the channel is crowded), the UE 120 may request dynamic beam refinement.

In some aspects, the UE 120 may request dynamic or codebook-based beam refinement based at least in part on a radio frequency (RF) impairment, such as phase noise, phase drift, and/or carrier frequency offset drift. For example, when a value of the RF impairment satisfies a threshold, the UE 120 may request codebook-based beam refinement.

When the value of the RF impairment does not satisfy the threshold, the UE 120 may request dynamic beam refinement.

In some aspects, the UE 120 may request dynamic or codebook-based beam refinement based at least in part on a beam switching rate and/or a fading rate. For example, when a value of the beam switching rate relative to the fading rate satisfies a threshold, the UE 120 may request codebook-based beam refinement. When the value of the beam switching rate relative to the fading rate does not satisfy the threshold, the UE 120 may request dynamic beam refinement.

In some aspects, the UE 120 may request dynamic or codebook-based beam refinement based at least in part on self-blockage associated with the UE 120. For example, when the UE 120 detects self-blockage, the UE 120 may request dynamic beam refinement.

In some aspects, the UE 120 may request dynamic or codebook-based beam refinement based at least in part on a number of blockers (e.g., obstructions, signal blockers, etc.) associated with the UE 120 or the BS 110. For example, when the number of blockers satisfies a threshold, the UE 120 may request dynamic beam refinement. When the number of blockers does not satisfy a threshold, the UE 120 may request codebook-based beam refinement.

As shown by reference number 580, when the UE 120 requests codebook-based beam refinement, the UE 120 and the BS 110 may perform the codebook-based beam refinement (e.g., a P-2, P-3 or other phase of a codebook beam refinement procedure). As shown by reference number 590, when the UE 120 requests dynamic beam refinement, the UE 120 and the BS 110 may perform dynamic beam refinement where a co-phasing factor is determined and fed back by the UE 120.

In this way, the UE 120 and BS 110 selectively perform dynamic beam refinement or codebook-based beam refinement based at least in part on a measurement, RF conditions, and search complexity, thereby conserving processing resources that would otherwise be used to perform dynamic beam refinement when it would not be sufficiently beneficial.

As indicated above, FIG. 5 is provided as an example. Other examples may differ from what is described with respect to FIG. 5. Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel. Furthermore, while process 500 is described with regard to a UE 120 and a BS 110, process 500 can be performed by any pair of wireless communication devices described herein.

Figure 6:
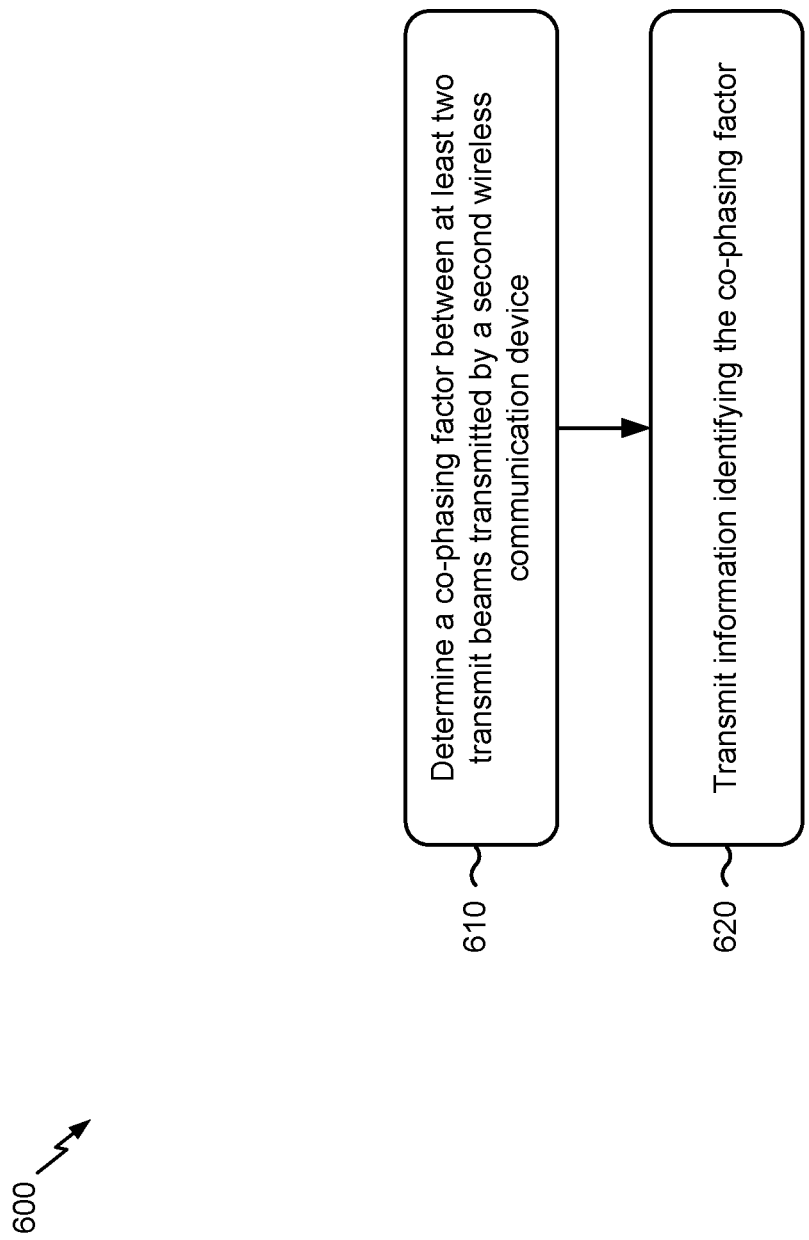
FIG. 6 is a diagram illustrating an example process performed, for example, by a first wireless communication device, in accordance with various aspects of the present disclosure.

FIG. 6 is a diagram illustrating an example process 600 performed, for example, by a first wireless communication device, in accordance with various aspects of the present disclosure. Example process 600 is an example where a first wireless communication device (e.g., BS 110, UE 120, a CPE, etc.) performs dynamic beamforming using a non-codebook-based approach.

As shown in FIG. 6, in some aspects, process 600 may include determining a co-phasing factor between at least two transmit beams transmitted by a second wireless communication device (block 610). For example, the first wireless communication device (e.g., using controller/processor 240, controller/processor 280, and/or the like) may determine a co-phasing factor, as described in more detail elsewhere herein. The co-phasing factor may be determined for generation of at least one co-phased beam by the second wireless communication device. In some aspects, the co-phasing factor may be between at least two transmit beams transmitted by the second wireless communication device. For example, the at least two transmit beams may be selected or generated as part of a codebook-based beamforming process.

As shown in FIG. 6, in some aspects, process 600 may include transmitting information identifying the co-phasing factor (block 620). For example, the first wireless communication device (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may transmit information identifying the co-phasing factor to the second wireless communication device. The second wireless communication device may generate the at least one co-phased beam based at least in part on the co-phasing factor and one or more transmit beams, as described in more detail elsewhere herein. In some aspects, the first wireless communication device may generate a receive beam corresponding to the at least one co-phased beam, as is also described in more detail elsewhere herein. For example, the first wireless communication device may determine a co-phasing factor for receive beams of the first wireless communication device to receive the at least one co-phased beam.

Process 600 may include additional aspects, such as any single aspect and/or any combination of aspects described below and/or in connection with one or more other processes described elsewhere herein.

In some aspects, the co-phasing factor is based at least in part on a set of measurements determined by the first wireless communication device. In some aspects, the co-phasing factor is based at least in part on a correlation of signals or beams of the at least two transmit beams received by the first wireless communication device from the second wireless communication device. In some aspects, the co-phasing factor is selected from a finite set of phase shifter combinations.

In some aspects, the first wireless communication device may receive, using one or more sampling beams of the first wireless communication device, one or more training symbols from the second wireless communication device via the at least one co-phased beam; and perform a receive beam refinement procedure based at least in part on the one or more training symbols. In some aspects, beam weights of the one or more sampling beams are based at least in part on at least one of per-antenna selections using one of multiple antennas of the first wireless communication device, column vectors of a unitary matrix, column vectors of a unitary matrix with equal gain amplitudes, or column vectors of a quasi-unitary matrix. In some aspects, the first wireless communication device may determine or modify at least one receive beam based at least in part on the one or more training symbols. In some aspects, the at least one receive beam is based at least in part on a covariance matrix estimate from multiple time or frequency samples. In some aspects, the at least one receive beam is based at least in part on an effective channel estimate from a single time sample. In some aspects, the at least one receive beam is based at least in part on a quantization of a phase shift or amplitude value.

In some aspects, at least one of the at least one co-phased beam or at least one receive beam is determined based at least in part on a correction factor or a decay factor for a measurement or a sample used to determine the at least one co-phased beam or the at least one receive beam. In some aspects, the correction factor is based at least in part on at least one of a phase noise drift, a carrier frequency offset drift, a frequency domain weight value, or a time domain weight value. In some aspects, the decay factor indicates a weight associated with the measurement or the sample based at least in part on one or more of a measure of importance or reliability of the measurement or the sample or an age of the sample.

In some aspects, the first wireless communication device may determine whether to use a codebook-based technique, or a technique using the co-phasing factor, for the at least one co-phased beam or at least one receive beam. In some aspects, the determination of whether to use the codebook-based technique or the technique using the co-phasing factor is based at least in part on at least one of a measure of robustness of communications between the first wireless communication device and the second wireless communication device, a mobility state of the first wireless communication device, a measure of a number of dominant clusters or paths in a channel between the first wireless communication device and the second wireless communication device, phase noise or phase drift, carrier frequency offset drift, a beam switching rate, a fading rate, self-blockage associated with the first wireless communication device, or a measure of a number of blockers associated with the first wireless communication device or the second wireless communication device.

In some aspects, the first wireless communication device is a UE or a CPE and the second wireless communication device is a base station. In some aspects, the first wireless communication device is a UE or a CPE and the second wireless communication device is a base station. In some aspects, the first wireless communication device is a base station and the second wireless communication device is a UE or a CPE. In some aspects, the first wireless communication device and the second wireless communication device are base stations. In some aspects, at least one beam, of the at least two transmit beams, is based at least in part on a codebook associated with the second wireless communication device. In some aspects, the first wireless communication device may transmit, to the second wireless communication device, information identifying the at least two transmit beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
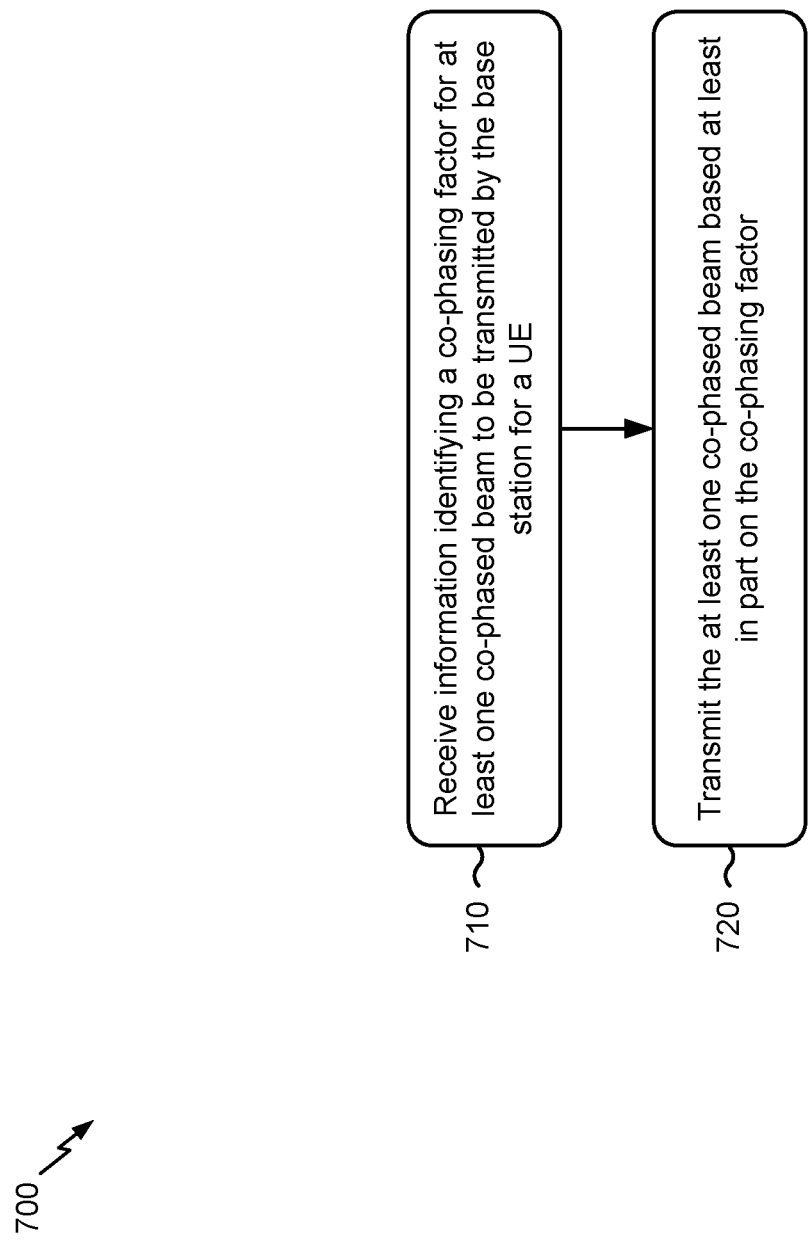
FIG. 7 is a diagram illustrating an example process performed, for example, by a base station, in accordance with various aspects of the present disclosure.

FIG. 7 is a diagram illustrating an example process 700 performed, for example, by a first wireless communication device, in accordance with various aspects of the present disclosure. Example process 700 is an example where a first wireless communication device (e.g., BS 110 or UE 120) performs dynamic beamforming using a non-codebook-based approach.

As shown in FIG. 7, in some aspects, process 700 may include receiving information identifying a co-phasing factor for at least one co-phased beam to be transmitted by a first wireless communication device for a second wireless communication device (block 710). For example, the first wireless communication device may receive (e.g., using antenna 234, DEMOD 232, MIMO detector 236, receive processor 238, controller/processor 240, and/or the like) information identifying a co-phasing factor. The co-phasing factor may be determined by a second wireless communication device. The co-phasing factor may identify a phase offset, an amplitude, and/or the like for at least one co-phased beam to be transmitted by the first wireless communication device for the second wireless communication device.

As shown in FIG. 7, in some aspects, process 700 may include transmitting the at least one co-phased beam based at least in part on the co-phasing factor (block 720). For example, the first wireless communication device may transmit (e.g., using controller/processor 240, transmit processor 220, TX MIMO processor 230, MOD 232, antenna 234, and/or the like) the at least one co-phased beam to the second wireless communication device. The base station may transmit the at least one co-phased beam based at least in part on the co-phasing factor. In some aspects, the first wireless communication device and the second wireless communication device may perform a receive beam refinement procedure with regard to the at least one co-phased beam, as described in more detail elsewhere herein.

Process 700 may include additional aspects, such as any single aspect and/or any combination of aspects described below and/or in connection with one or more other processes described elsewhere herein.

In some aspects, the at least one co-phased beam is based at least in part on a combination of two or more different beams based at least in part on the co-phasing factor, the two or more different beams comprising at least one of the at least one transmit beam. In some aspects, the at least one co-phased beam is based at least in part on a combination of the at least two transmit beams based at least in part on the co-phasing factor. In some aspects, the first wireless communication device may transmit signals to the second wireless communication device on the at least two transmit beams, wherein the co-phasing factor is based at least in part on a correlation of the signals, wherein receiving the information comprising the co-phasing factor comprises receiving in response to transmitting the signals to the second wireless communication device on the at least two transmit beams, and wherein transmitting the at least one co-phased beam comprises generating and transmitting the co-phased beam based on the at least two transmit beams and the co-phasing factor. In some aspects, the at least one transmit beam includes at least one best beam of an initial beam alignment phase.

In some aspects, the first wireless communication device may transmit one or more training symbols to the second wireless communication device using the at least one co-phased beam, wherein the second wireless communication device performs a receive beam refinement procedure based on the one or more training symbols.

In some aspects, at least one of the at least one transmit beam or the at least one co-phased beam is determined based at least in part on a correction factor or a decay factor for a measurement or a sample used to determine the at least one transmit beam or the at least one co-phased beam. In some aspects, at least one beam of the at least one transmit beam is based at least in part on a codebook associated with the first wireless communication device.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
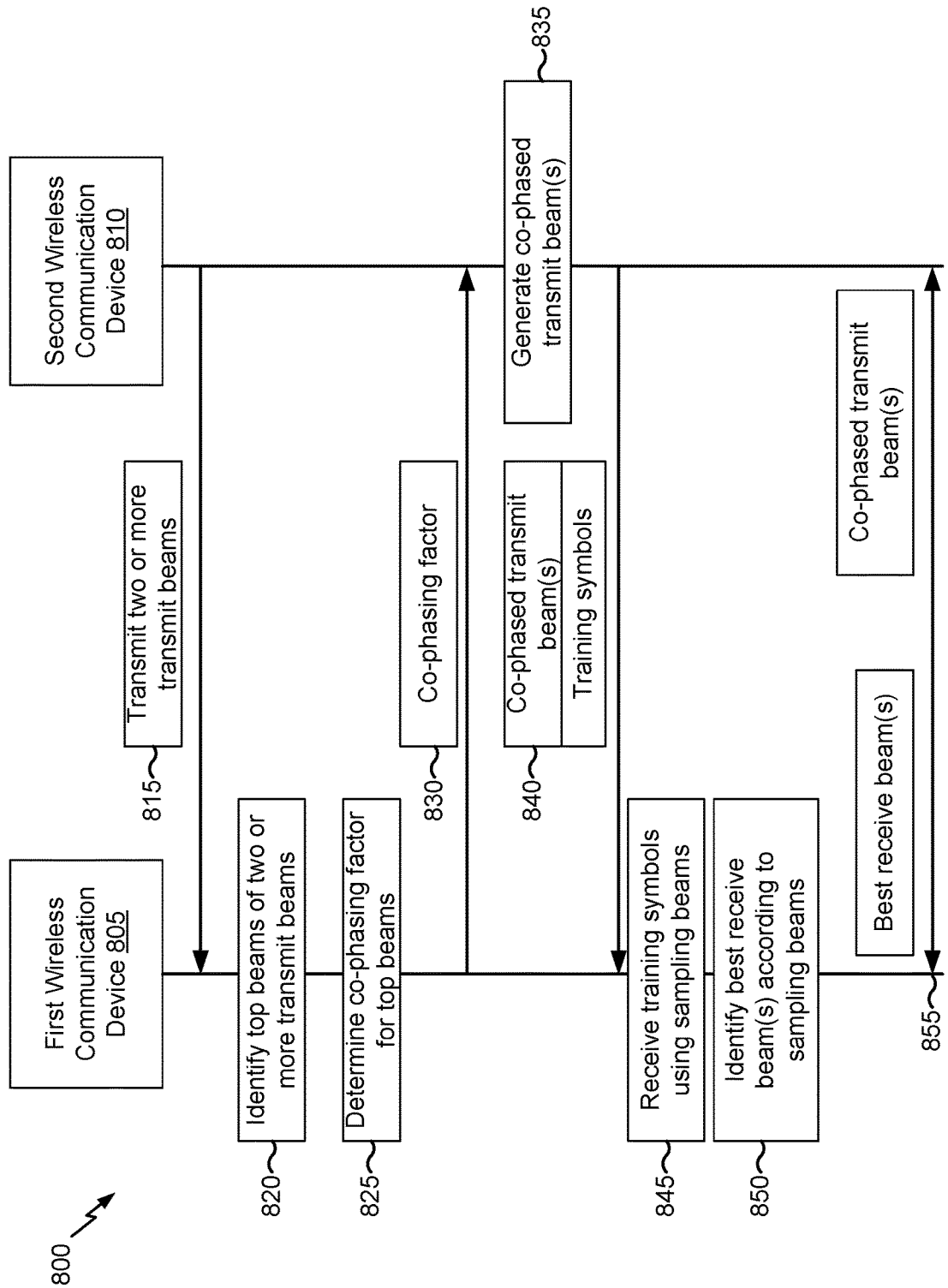
FIG. 8 is a call flow diagram illustrating an example process for determining co-phased transmit beam(s) and corresponding receive beam(s), in accordance with various aspects of the present disclosure.

FIG. 8 is a call flow diagram illustrating an example process 800 for determining co-phased transmit beam(s) and corresponding receive beam(s), in accordance with various aspects of the present disclosure. As shown, process 800 may be performed by a first wireless communication device 805 and a second wireless communication device 810. First wireless communication device 805 may include a UE (e.g., UE 120), a BS (e.g., BS 110), a CPE, and/or the like. Second wireless communication device 810 may include a UE (e.g., UE 120), a BS (e.g., BS 110), a CPE, and/or the like.

As shown in FIG. 8, and by reference number 815, the second wireless communication device 810 may transmit two or more transmit beams. For example, the second wireless communication device 810 may transmit the two or more transmit beams from a codebook and/or the like. In some aspects, the second wireless communication device 810 may perform a P-1 phase of a beam selection procedure to transmit the two or more transmit beams.

As shown by reference number 820, the first wireless communication device 805 may identify top beams, of the two or more transmit beams. For example, the first wireless communication device 805 may identify two, three, four, or more top beams (e.g., based at least in part on signal quality, signal strength, etc.).

As shown by reference number 825, the first wireless communication device 805 may determine a co-phasing factor for the top beams of the two or more transmit beams. For example, the first wireless communication device 805 may determine one or more co-phasing factors based at least in part on correlations of signals (e.g., sets of beams of the best beams) received by the first wireless communication device 805.

As shown by reference number 830, the first wireless communication device 805 may provide information identifying the co-phasing factor to the second wireless communication device 810. For example, the first wireless communication device 805 may provide the information identifying the co-phasing factor (or multiple co-phasing factors) to the second wireless communication device 810.

As shown by reference number 835, the second wireless communication device 810 may generate one or more co-phased transmit beams. For example, the second wireless communication device 810 may generate one or more co-phased transmit beams. In some aspects, the second wireless communication device 810 may generate a single co-phased transmit beam that covers two or more channels (or clusters of channels) between the first wireless communication device 805 and the second wireless communication device 810. In some aspects, the second wireless communication device 810 may generate multiple co-phased transmit beams using the co-phasing factor. In this way, the second wireless communication device 810 generates one or more co-phased beams using a co-phasing factor, thereby enabling dynamic (e.g., non-codebook-based) generation of beams.

As shown by reference number 840, the second wireless communication device 810 may transmit the one or more co-phased transmit beams to the first wireless communication device 805. As further shown, the second wireless communication device 810 may transmit training symbols to the first wireless communication device 805. For example, the second wireless communication device 810 may transmit the training symbols using the one or more co-phased transmit beams. In some aspects, the second wireless communication device 810 may transmit the training symbols over a particular frequency, time, space, and/or code range, thereby enabling refinement of receive beams of the first wireless communication device 805 over time.

As shown by reference number 845, the first wireless communication device 805 may receive the training symbols using sampling beams. For example, the first wireless communication device 805 may receive the training symbols using sampling beams generated by the first wireless communication device 805. For example, the first wireless communication device 805 may change phase and/or amplitude across antennas of the first wireless communication device 805 to generate various sampling beams.

As shown by reference number 850, the first wireless communication device 805 may identify one or more best receive beams according to (e.g., using) the sampling beams. For example, the first wireless communication device 805 may identify the one or more best receive beams based at least in part on the training symbols. In some aspects, the one or more best receive beams may include at least one of the sampling beams. Additionally, or alternatively, the one or more best receive beams may be generated based at least in part on at least one of the best receive beams. In some aspects, the one or more best receive beams may include one or more co-phased beams, determined as described elsewhere herein.

As shown by reference number 855, the first wireless communication device 805 and the second wireless communication device 810 may communicate using the one or more best receive beams and the one or more co-phased transmit beams. For example, the first wireless communication device 805 and the second wireless communication device 810 may communicate using the one or more best receive beams (e.g., used by the first wireless communication device 805 to receive a transmission) and the one or more co-phased transmit beams (e.g., generated by the second wireless communication device 810 to transmit information). In some aspects, the second wireless communication device 810 may perform transmit beam refinement with regard to the one or more co-phased transmit beams, as described in more detail elsewhere herein.

As indicated above, FIG. 8 is provided as an example. Other examples are possible and may differ from what was described with regard to FIG. 8.

Figure 9:
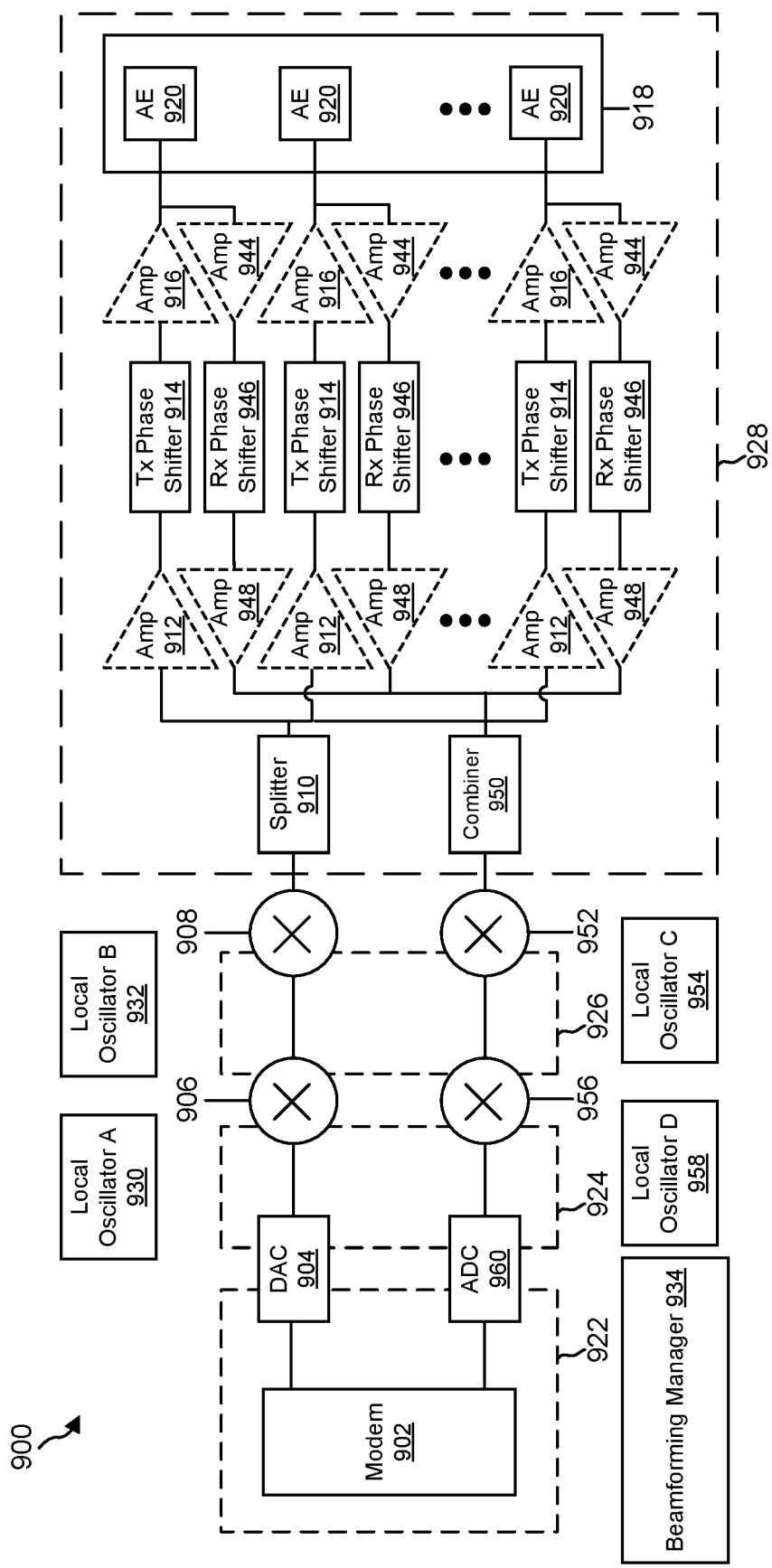
FIG. 9 is a diagram illustrating example hardware components of a wireless communication device, in accordance with various aspects of the present disclosure.

FIG. 9 is a diagram illustrating example hardware components of an architecture 900 of a wireless communication device in accordance with various aspects of the disclosure. The illustrated components may include those that may be used for antenna element selection and/or for beamforming for transmission and/or reception of wireless signals. There are numerous architectures for antenna element selection and implementing phase shifting, only one example of which is illustrated here. The architecture 900 may include a modem (modulator/demodulator) 902 (e.g., MOD/DEMOD 254 and/or MOD/DEMOD 232). The architecture 900 may include a digital to analog converter (DAC) 904, a first mixer 906, a second mixer 908, and/or a splitter 910 for transmission. The architecture 900 may include a plurality of first amplifiers 912, a plurality of transmit phase shifters 914 (shown as Tx Phase Shifters 914), a plurality of second amplifiers 916, and/or an antenna array 918 that includes a plurality of antenna elements (AEs) 920 (e.g., antennas 234 and/or antennas 252). The architecture 900 also includes a local oscillator A 930 and a local oscillator B 932 for transmission. The architecture 900 may include a transmit chain and a receive chain. The transmit chain of the architecture 900 may include the components 904, 906, 908, 910, 912, 914, 916, 918, 920, 930, and/or 932 (or any subset of these components). The receive chain of the architecture 900 may include the modem 902, at least some of the antenna elements 920 of the antenna array 918, a plurality of third amplifiers 944, a plurality of receive phase shifters (Rx Phase Shifters) 946, a plurality of fourth amplifiers 948, a combiner 950, a third mixer 952, a local oscillator C 954, a fourth mixer 956, a local oscillator D 958, and/or an analog to digital converter (ADC) 960. In some aspects, a component may be included in both the receive chain and the transmit chain. The operation of the transmit chain and the receive chain are described below.

Transmission lines or other waveguides, wires, traces, or the like are shown connecting the various components to illustrate how signals to be transmitted may travel between components of the architecture 900. Boxes 922, 924, 926, and 928 indicate regions in the architecture 900 in which different types of signals travel or are processed. Specifically, box 922 indicates a region in which digital baseband signals travel or are processed, box 924 indicates a region in which analog baseband signals travel or are processed, box 926 indicates a region in which analog intermediate frequency (IF) signals travel or are processed, and box 928 indicates a region in which analog radio frequency (RF) signals travel or are processed.

Each of the antenna elements 920 may include one or more sub-elements (not shown) for radiating (e.g., transmitting) or receiving RF signals. For example, a single antenna element 920 may include a first sub-element cross-polarized with a second sub-element that can be used to independently transmit or receive cross-polarized signals. The antenna elements 920 may include patch antennas or other types of antennas arranged in a linear, two dimensional, or other pattern. A spacing between antenna elements 920 may be such that signals with a desired wavelength transmitted or received separately by the antenna elements 920 may interact or interfere with each other (e.g., to form a desired beam). For example, given an expected range of wavelengths or frequencies, the spacing may provide a quarter wavelength, half wavelength, or other fraction of a wavelength of spacing between neighboring antenna elements 920 to allow for interaction or interference of signals transmitted or received by the separate antenna elements 920 within that expected range.

The modem 902 processes and generates digital baseband signals and may also control operation of the DAC 904, first mixer 906, second mixer 908, splitter 910, first amplifiers 912, transmit phase shifters 914, and/or the second amplifiers 916 to transmit signals via one or more or all of the antenna elements 920. In some aspects, the modem 902 controls operation of the third amplifiers 944, receive phase shifters 946, fourth amplifiers 948, combiner 950, third mixer 952, fourth mixer 956, and/or ADC 960 to receive signals via one or more of the antenna elements 920. In some aspects, the modem 902 may process signals and control operation in accordance with a communication standard such as a wireless standard discussed herein.

The DAC 904 may convert digital baseband signals received from the modem 902 (and that are to be transmitted) into analog baseband signals. The first mixer 906 may upconvert analog baseband signals to analog intermediate frequency (IF) signals within an IF using the local oscillator A 930. For example, the first mixer 906 may mix the signals with an oscillating signal generated by the local oscillator A 930 to "move" the baseband analog signals to the IF. In some aspects, processing or filtering (not shown) may take place at the IF. The second mixer 908 may upconvert the analog IF signals to analog radio frequency (RF) signals using the local oscillator B 932. Similar to the first mixer 906, the second mixer 908 may mix the signals with an oscillating signal generated by the local oscillator B 932 to "move" the IF analog signals to the RF, or to the frequency at which signals will be transmitted or received. The modem 902 and/or the beamforming manager 934 may adjust the frequency of local oscillator A 930 and/or the local oscillator B 932 so that a desired IF and/or RF frequency is produced and used to facilitate processing and transmission of a signal within a desired bandwidth.

In the architecture 900, signals upconverted by the second mixer 908 are split or duplicated into multiple signals by the splitter 910. The splitter 910 in architecture 900 splits the RF signal into a plurality of identical or nearly identical RF signals, as denoted by its presence in box 928. In some aspects, the split may take place with any type of signal including with baseband digital, baseband analog, or IF analog signals. Each of these signals may correspond to an antenna element 920. A signal, of these signals, may travel through and be processed by amplifiers 912, 916, transmit phase shifters 914, and/or other elements corresponding to the respective antenna element 920 to be provided to and transmitted by the corresponding antenna element 920 of the antenna array 918. In some aspects, the splitter 910 may be an active splitter that is connected to a power supply and provides some gain so that RF signals exiting the splitter 910 are at a power level equal to or greater than the signal entering the splitter 910. In some aspects, the splitter 910 is a passive splitter that is not connected to a power supply and the RF signals exiting the splitter 910 may be at a power level lower than the RF signal entering the splitter 910.

After being split by the splitter 910, the resulting RF signals may enter an amplifier, such as a first amplifier 912, or a transmit phase shifter 914 corresponding to an antenna element 920. The first and second amplifiers 912, 916 are illustrated with dashed lines because one or both of them might not be included in some aspects. In some aspects, both the first amplifier 912 and second amplifier 916 are present. In some aspects, neither the first amplifier 912 nor the second amplifier 916 is present. In some aspects, one of the two amplifiers 912, 916 is present and not the other. By way of example, if the splitter 910 is an active splitter, the first amplifier 912 might not be used. By way of further example, if the transmit phase shifter 914 is an active phase shifter that can provide a gain, the second amplifier 916 might not be used. The amplifiers 912, 916 may provide a desired level of positive or negative gain. A positive gain (positive dB) may be used to increase an amplitude of a signal for radiation by a specific antenna element 920. A negative gain (negative dB) may be used to decrease an amplitude and/or suppress radiation of the signal by a specific antenna element. Each of the amplifiers 912, 916 may be controlled independently (e.g., by the modem 902 or beamforming manager 934) to provide independent control of the gain for each antenna element 920. For example, the modem 902 and/or the beamforming manager 934 may have at least one control line connected to one or more of the splitter 910, first amplifiers 912, transmit phase shifters 914, and/or second amplifiers 916. The at least one control line may be used to configure a gain to provide a desired amount of gain for each component and thus each antenna element 920.

The transmit phase shifter 914 may provide a configurable phase shift or phase offset to a corresponding RF signal to be transmitted. The transmit phase shifter 914 may be a passive phase shifter (e.g., not directly connected to a power supply). Passive phase shifters may introduce some insertion loss. In such a case, the second amplifier 916 may boost the signal to compensate for the insertion loss. The transmit phase shifter 914 may be an active phase shifter connected to a power supply such that the active phase shifter provides some amount of gain or prevents insertion loss. The settings of each of the transmit phase shifters 914 may be independent, meaning that each transmit phase shifter 914 can be set to provide a desired amount of phase shift, or the same amount of phase shift, or some other configuration. The modem 902 and/or the beamforming manager 934 may have at least one control line connected to each of the transmit phase shifters 914. The at least one control line may be used to configure the transmit phase shifters 914 to provide desired amounts of phase shift or phase offset between antenna elements 920.

The receive chain may operate in a similar, but reverse manner to the transmit chain. For example, the antenna elements 920 may receive RF signals. The receive phase shifter 946 may provide a configurable phase shift or phase offset to an RF signal received on a corresponding antenna element 920. The receive phase shifter 946 may be an active phase shifter or a passive phase shifter, as described in more detail above. The third amplifier 944 may attenuate or amplify the RF signal (e.g., when the receive phase shifter is a passive phase shifter). The fourth amplifier 948 may attenuate or amplify the RF signal (e.g., to an amplitude appropriate for the combiner 950). Each of the amplifiers 944, 948 may be controlled independently (e.g., by the modem 902 or beamforming manager 934) to provide independent control of the gain for each RF signal received on a corresponding antenna element 920. For example, the modem 902 and/or the beamforming manager 934 may have at least one control line connected to one or more of the combiner 950, third amplifiers 944, receive phase shifters 946, and/or fourth amplifiers 948. The at least one control line may be used to configure a gain to provide a desired amount of gain (e.g., positive or negative gain) for each component and thus each antenna element 920. The third and fourth amplifiers 944, 948 are illustrated with dashed lines because one or both of them might not be included in the architecture 900.

Collectively, the third amplifiers 944, the receive phase shifter 946, and/or the amplifier 948 may provide for respective RF signals to be shifted and/or amplified relative to each other to effectively "steer" the receive direction of the antenna array 918.

After phase shifting is performed at the receive phase shifters 946, the combiner 950 combines the RF signals into a combined RF signal, as denoted by its presence in box 928. The resulting combined RF signal may effectively be the signal received in a direction corresponding to the phase shifts and gains of the receive phase shifters 914 and third and fourth amplifiers 944, 948. In some aspects, the combining may take place with any type of signal including with baseband digital, baseband analog, or IF analog signals. In some aspects, the combiner 950 may be an active combiner that provides some gain or attenuation so that the RF signal exiting the combiner 950 is at a power level appropriate for down-conversion. In some aspects, the combiner 950 is a passive combiner, in which case the fourth amplifiers 948 may provide an appropriate level of gain or attenuation to the respective RF signals.

The third mixer 952 may mix the RF signal with an oscillating signal generated by the local oscillator C 954 to "move" the RF signal to an IF. For example, the third mixer 952 may down-convert the analog RF signal to an analog IF signal by mixing the combined signal with a signal generated by the local oscillator C 954. In some aspects, processing or filtering (not shown) may take place in the IF domain. The fourth mixer 956 may down-convert the analog IF signal to an analog baseband signal using the local oscillator D 958. For example, the fourth mixer 956 may mix the IF signal with an oscillating signal generated by the local oscillator D 958 to "move" the IF analog signal to the baseband, thereby generating an analog baseband signal.

The ADC 960 may convert analog baseband signals into digital baseband signals. The modem 902 may process the digital baseband signals.

The architecture 900 is given by way of example only to illustrate an architecture for transmitting and/or receiving signals. It will be understood that the architecture 900 and/or one or more portions of the architecture 900 may be repeated multiple times within an architecture to accommodate or provide an arbitrary number of transmit chains, receive chains, antenna elements, and/or antenna panels. Furthermore, numerous alternative architectures are contemplated. For example, although only a single antenna array 918 is shown, two, three, or more antenna arrays may be included in the architecture 900, each with one or more of their own corresponding amplifiers, phase shifters, splitters, combiners, mixers, DACs, ADCs, and/or modems. For example, a single UE may include two, four, or more antenna arrays for transmitting or receiving signals at different physical locations on the UE or in different directions. Furthermore, mixers, splitters, combiners, amplifiers, phase shifters, and other components may be located in different signal type areas (e.g., different ones of the boxes 922, 924, 926, 928) in different implemented architectures. For example, a split or combination of the signal may take place at the analog RF, the analog IF, the analog baseband, or the digital baseband frequencies in different aspects. Similarly, amplification, attenuation, and/or phase shifts may also take place at different frequencies. For example, in some aspects, one or more of the splitter 910, amplifiers 912, 916, or phase shifters 914 may be located between the DAC 904 and the first mixer 906 or between the first mixer 906 and the second mixer 908. In some aspects, one or more of the combiner 950, amplifiers 944, 948, or receive phase shifters 946 may be located between the ADC 560 and the fourth mixer 956 or between the fourth mixer 956 and the third mixer 952. In some aspects, the functions of two or more of the components may be combined into one component. For example, the transmit phase shifters 914 may perform amplification to include or replace the first and/or second amplifiers 912, 916, or the receive phase shifters 946 may perform amplification or attenuation to include or replace the third and/or fourth amplifiers 944, 948. As another example, a phase shift may be implemented by the second mixer 908 or third mixer 952 to obviate a need for a separate transmit phase shifter 914 or receive phase shifter 946. This technique is sometimes called local oscillator (LO) phase shifting. In some aspects of this configuration, there may be a plurality of IF to RF mixers or RF to IF mixers (e.g., one for each antenna element 920) within the second mixer 908 or the third mixer 952. In such cases, the local oscillator B 932 or the local oscillator C 954 would supply different local oscillator signals (e.g., with different phase offsets) to each IF to RF mixer or RF to IF mixer.

The modem 902 and/or the beamforming manager 934 may control one or more of the other components of the architecture 900 to select one or more antenna elements 920 and/or to form beams for transmission or reception of one or more signals. For example, the antenna elements 920 may be individually selected or deselected for transmission or reception of a signal (or signals) by controlling an amplitude of one or more corresponding amplifiers of the architecture 900. Beamforming for transmission includes generation of a beam (sometimes referred to as a transmit beam) using a plurality of signals on different antenna elements 920, where one or more or all of the plurality of signals are shifted in phase relative to each other. The formed beam may carry physical layer or higher layer reference signals or information. As each signal of the plurality of signals is radiated from a respective antenna element 920, the radiated signals interact (e.g., interfere, amplify) with each other to form a resulting transmit beam. The shape (e.g., the amplitude, the width, and/or presence of side lobes) and the direction (e.g., an angle of the beam relative to a surface of the antenna array 918) of the transmit beam can be dynamically controlled by modifying the phase shifts or phase offsets imparted by the transmit phase shifters 914 and amplitudes imparted by the amplifiers 912, 916 of the plurality of signals relative to each other.

Beamforming for reception includes tuning to receive at a specific angle and width (sometimes referred to as a receive beam) by processing signals on different antenna elements 920 based on respective phase shifts to receive a beam in a particular shape and direction. Similar to a transmit beam, the shape and direction of the "receive beam" can be controlled by modifying the phase shifts or phase offsets imparted by the receive phase shifters 946 and amplitudes controlled by the amplifiers 944, 948 of the plurality of signals relative to each other. In some aspects, a beam (e.g., a transmit beam or a receive beam) may be shaped or directed to cover multiple clusters (e.g., to cover clusters associated with a set of two or more best beams). In some aspects, multiple beams may be co-phased to cover the multiple clusters.

The beamforming manager 934 may configure transmit beams and/or receive beams of the wireless communication device, as described herein. For example, the beamforming manager 934 may identify selected beams, may cause feedback identifying the selected beams to be provided, and/or may configure transmit beams or receive beams based at least in part on one or more co-phasing factors of the selected beams and/or based at least in part on the feedback. In some aspects, the beamforming manager 934 may select whether to use a codebook based beamforming technique, or a non-codebook based beamforming technique, for beamforming. In some aspects, the beamforming manager 934 may be located partially or fully within one or more other components of the architecture 900. For example, the beamforming manager 934 may be located within the modem 902.

As indicated above, FIG. 9 is provided as an example. Other examples may differ from what is described with regard to FIG. 9.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first wireless communication device, comprising:
    determining a co-phasing factor between at least two transmit beams transmitted by a second wireless communication device, wherein the co-phasing factor is determined for generation of at least one co-phased beam by the second wireless communication device;
    transmitting information identifying the co-phasing factor to the second wireless communication device;
    receiving one or more training symbols from the second wireless communication device via the at least one co-phased beam; and
    performing a receive beam refinement procedure based at least in part on the one or more training symbols.

2. The method of claim 1, wherein the co-phasing factor is based at least in part on a set of measurements determined by the first wireless communication device.

3. The method of claim 1, wherein the co-phasing factor is based at least in part on a correlation of signals or beams of the at least two transmit beams received by the first wireless communication device from the second wireless communication device.

4. The method of claim 1, wherein the co-phasing factor is selected from a finite set of phase shifter combinations.

5. The method of claim 1, wherein the one or more training symbols are received using one or more sampling beams of the first wireless communication device.

6. The method of claim 5, wherein beam weights of the one or more sampling beams are based at least in part on at least one of:

per-antenna selections associated with one of multiple antennas of the first wireless communication device, column vectors of a unitary matrix, column vectors of a unitary matrix with equal gain amplitudes, or column vectors of a quasi-unitary matrix.

7. The method of claim 1, wherein the method further comprises:

determining or modifying at least one receive beam based at least in part on the one or more training symbols.

8. The method of claim 7, wherein the at least one receive beam is based at least in part on a covariance matrix estimate from multiple time or frequency samples.

9. The method of claim 7, wherein the at least one receive beam is based at least in part on an effective channel estimate from a single time sample.

10. The method of claim 7, wherein the at least one receive beam is based at least in part on a quantization of a phase shift or amplitude value.

11. The method of claim 1, wherein at least one of the at least one co-phased beam or at least one receive beam is determined based at least in part on a correction factor or a decay factor for a measurement or a sample used to determine the at least one co-phased beam or the at least one receive beam.

12. The method of claim 11, wherein the correction factor is based at least in part on at least one of a phase noise drift, a carrier frequency offset drift, a frequency domain weight value, or a time domain weight value.

13. The method of claim 11, wherein the decay factor indicates a weight associated with the measurement or the sample based at least in part on one or more of:

a measure of importance or reliability of the measurement or the sample, or an age of the sample.

14. The method of claim 1, further comprising:

determining whether to use a codebook-based technique, or a technique using the co-phasing factor, for the at least one co-phased beam or at least one receive beam.

15. The method of claim 14, wherein the determination of whether to use the codebook-based technique or the technique using the co-phasing factor is based at least in part on at least one of:

a measure of robustness of communications between the first wireless communication device and the second wireless communication device, a mobility state of the first wireless communication device, a measure of a number of dominant clusters or paths in a channel between the first wireless communication device and the second wireless communication device, phase noise or phase drift, carrier frequency offset drift, a beam switching rate, a fading rate, self-blockage associated with the first wireless communication device, or a measure of a number of blockers associated with the first wireless communication device or the second wireless communication device.

16. The method of claim 1, wherein the first wireless communication device is a user equipment (UE) or a customer premises equipment (CPE) and the second wireless communication device is a base station.

17. The method of claim 1, wherein the first wireless communication device is a base station and the second wireless communication device is a user equipment (UE) or a customer premises equipment (CPE).

18. The method of claim 1, wherein the first wireless communication device and the second wireless communication device are base stations.

19. The method of claim 1, wherein at least one beam, of the at least two transmit beams, is based at least in part on a codebook associated with the second wireless communication device.

20. The method of claim 1, further comprising:

transmitting, to the second wireless communication device, information identifying the at least two transmit beams.

21. A method of wireless communication performed by a first wireless communication device, comprising:

receiving information identifying a co-phasing factor for at least one co-phased beam to be transmitted by the first wireless communication device to a second wireless communication device, wherein the information identifying the co-phasing factor is based at least in part on at least two transmit beams transmitted to the second wireless communication device by the first wireless communication device;

transmitting the at least one co-phased beam to the second wireless communication device based at least in part on the co-phasing factor; and transmitting one or more training symbols to the second wireless communication device using the at least one co-phased beam, wherein the one or more training symbols include information for performing a receive beam refinement procedure.

22. The method of claim 21, wherein the at least one co-phased beam is based at least in part on a combination of the at least two transmit beams based at least in part on the co-phasing factor.

23. The method of claim 21, further comprising:

transmitting signals to the second wireless communication device on the at least two transmit beams, wherein the co-phasing factor is based at least in part on a correlation of the signals, wherein receiving the information comprising the co-phasing factor comprises receiving in response to transmitting the signals to the second wireless communication device on the at least two transmit beams, and wherein transmitting the at least one co-phased beam comprises generating and transmitting the co-phased beam based on the at least two transmit beams and the co-phasing factor.

24. The method of claim 21, wherein the at least two transmit beams include at least one best beam of an initial beam alignment phase.

25. The method of claim 21, wherein at least one of the at least two transmit beams or the at least one co-phased beam is determined based at least in part on a correction factor or a decay factor for a measurement or a sample used to determine the at least two transmit beams or the at least one co-phased beam.

26. The method of claim 21, wherein at least one beam of the at least two transmit beams is based at least in part on a codebook associated with a base station.

27. A first wireless communication device, comprising:

a memory; and one or more processors coupled to the memory, the memory and the one or more processors configured to:

determine a co-phasing factor between at least two transmit beams transmitted by a second wireless communication device, wherein the co-phasing factor is determined for generation of at least one co-phased beam by the second wireless communication device;

transmit information identifying the co-phasing factor to the second wireless communication device;

receive one or more training symbols from the second wireless communication device via the at least one co-phased beam; and perform a receive beam refinement procedure based at least in part on the one or more training symbols.

28. The first wireless communication device of claim 27, wherein the one or more training symbols are received using one or more sampling beams of the first wireless communication device.

29. A first wireless communication device, comprising:
a memory; and
one or more processors coupled to the memory, the memory and the one or more processors configured to:
receive information identifying a co-phasing factor for at least one co-phased beam to be transmitted by the first wireless communication device for a second wireless communication device, wherein the information identifying the co-phasing factor is based at least in part on at least two transmit beams transmitted to the second wireless communication device by the first wireless communication device;

transmit the at least one co-phased beam to the second wireless communication device based at least in part on the co-phasing factor; and transmit one or more training symbols to the second wireless communication device using the at least one co-phased beam, wherein the one or more training symbols include information for performing a receive beam refinement procedure.

30. The first wireless communication device of claim 29, wherein the at least one co-phased beam is based at least in part on a combination of the at least two transmit beams based at least in part on the co-phasing factor.

\* \* \* \* \*